United States Patent
Chung et al.

(10) Patent No.: US 9,597,600 B2
(45) Date of Patent: Mar. 21, 2017

(54) SYSTEMS AND METHODS FOR GENERATING VIDEO HINTS FOR SEGMENTS WITHIN AN INTERACTIVE VIDEO GAMING ENVIRONMENT

(71) Applicant: United Video Properties, Inc., Santa Clara, CA (US)

(72) Inventors: David Chung, Santa Clara, CA (US); Walter R. Klappert, Los Angeles, CA (US)

(73) Assignee: Rovi Guides, Inc., San Carlos, CA (US)

( * ) Notice: Subject to any disclaimer, the term of this patent is extended or adjusted under 35 U.S.C. 154(b) by 549 days.

(21) Appl. No.: 14/102,139

(22) Filed: Dec. 10, 2013

(65) Prior Publication Data
US 2014/0100040 A1    Apr. 10, 2014

Related U.S. Application Data

(63) Continuation of application No. 13/170,755, filed on Jun. 28, 2011, now Pat. No. 8,628,423.

(51) Int. Cl.
*A63F 9/24*     (2006.01)
*A63F 13/00*   (2014.01)
(Continued)

(52) U.S. Cl.
CPC ............. *A63F 13/86* (2014.09); *A63F 13/12* (2013.01); *A63F 13/35* (2014.09); *A63F 13/63* (2014.09);
(Continued)

(58) Field of Classification Search
CPC .......... A63F 13/35; A63F 13/60; A63F 13/63; A63F 13/85–13/87; A63F 2300/305;
(Continued)

(56) References Cited

U.S. PATENT DOCUMENTS 5,558,339 A    9/1996  Perlman
5,822,123 A    10/1998 Davis et al.
(Continued)

FOREIGN PATENT DOCUMENTS

AU    WO 2008052254 A1 *  5/2008  ............. A63F 13/10
JP    2001-162039 A       6/2001
(Continued)

OTHER PUBLICATIONS

"GameAnyone.com—Video Walkthroughs". [dated Jun. 22, 2011], [online], [retrieved on Aug. 7, 2012]. URL:"http://web.archive.org/web/20110622090600/http://www.gamanyone.com/ <URL:%22http://web.archive.org/web/20110622090600/http://www.gamanyone.com/>. 2 Pages.

*Primary Examiner* — Milap Shah
(74) *Attorney, Agent, or Firm* — Ropes & Gray LLP

(57) ABSTRACT

Systems and methods for generating hints for a player with an interactive video gaming environment are provided. A plurality of videos from users is received at a remote server. Each of the plurality of videos includes a hint that corresponds to a different one of a plurality of segments within the interactive video gaming environment. An action relating to game play in the interactive video gaming environment is received at the remote server from player equipment. A determination is made as to whether the action is associated with one of the plurality of segments. In response to determining the action is associated with one of the plurality of segments, one of the plurality of videos that includes the hint that corresponds to the one of the plurality of segments associated with the action is selected. The selected one of the plurality of videos is transmitted to the player equipment.

20 Claims, 9 Drawing Sheets

(51) Int. Cl.
*A63F 13/86* (2014.01)
*A63F 13/63* (2014.01)
*A63F 13/35* (2014.01)
*A63F 13/30* (2014.01)

(52) U.S. Cl.
CPC . *A63F 2300/305* (2013.01); *A63F 2300/5593* (2013.01); *A63F 2300/577* (2013.01); *A63F 2300/6018* (2013.01)

(58) Field of Classification Search
CPC ........ A63F 2300/577; A63F 2300/5593; A63F 2300/6018
See application file for complete search history.

(56) References Cited

U.S. PATENT DOCUMENTS

| | | | |
|---|---|---|---|
| 6,609,976 B1 | 8/2003 | Yamagishi et al. | |
| 6,893,341 B2 | 5/2005 | Walker et al. | |
| 6,893,941 B2 | 5/2005 | Suda | |
| 7,192,401 B2 | 3/2007 | Saalasti et al. | |
| RE39,830 E | 9/2007 | Balabanovic | |
| 7,702,015 B2 | 4/2010 | Richter et al. | |
| 7,789,757 B2 | 9/2010 | Gemelos et al. | |
| 7,872,655 B2 | 1/2011 | Hughes et al. | |
| 8,038,535 B2 | 10/2011 | Jensen | |
| 8,221,220 B2 | 7/2012 | Ackley et al. | |
| 8,498,722 B2* | 7/2013 | Chung | H04N 21/274 463/16 |
| 8,657,680 B2 | 2/2014 | Chung et al. | |
| 8,753,183 B2* | 6/2014 | Davison | A63F 13/355 463/1 |
| 8,882,582 B2* | 11/2014 | Avent | A63F 13/10 463/23 |
| 9,101,833 B2* | 8/2015 | Behmaram-Mosavat | A63F 13/10 |
| 2003/0119578 A1 | 6/2003 | Newson | |
| 2004/0005918 A1 | 1/2004 | Walker et al. | |
| 2005/0246638 A1 | 11/2005 | Whitten | |
| 2006/0287106 A1 | 12/2006 | Jensen | |
| 2007/0117635 A1 | 5/2007 | Spanton et al. | |
| 2007/0157093 A1* | 7/2007 | Karcher | G06F 9/4446 715/707 |
| 2007/0168309 A1 | 7/2007 | Tzruya et al. | |
| 2007/0218974 A1 | 9/2007 | Patel et al. | |
| 2007/0244585 A1 | 10/2007 | Speiser et al. | |
| 2007/0287518 A1 | 12/2007 | Nagel et al. | |
| 2008/0039204 A1* | 2/2008 | Ackley | A63F 13/332 463/40 |
| 2008/0113699 A1 | 5/2008 | Stevens et al. | |
| 2008/0182665 A1* | 7/2008 | Sharps | A63F 13/12 463/42 |
| 2008/0227553 A1 | 9/2008 | Leifenberg et al. | |
| 2008/0311997 A1 | 12/2008 | Goossen et al. | |
| 2009/0088233 A1* | 4/2009 | O'Rourke | A63F 13/10 463/7 |
| 2009/0131177 A1 | 5/2009 | Pearce | |
| 2009/0196516 A1 | 8/2009 | Perlman et al. | |
| 2009/0263772 A1 | 10/2009 | Root et al. | |
| 2010/0087257 A1* | 4/2010 | Deb | G06N 3/006 463/43 |
| 2011/0098108 A1 | 4/2011 | Kuper et al. | |
| 2011/0207525 A1 | 8/2011 | Allen et al. | |
| 2011/0218044 A1 | 9/2011 | Joshi et al. | |
| 2011/0287834 A1 | 11/2011 | Lindmeir et al. | |
| 2011/0306395 A1 | 12/2011 | Ivory et al. | |
| 2011/0319229 A1 | 12/2011 | Corbalis et al. | |
| 2012/0021840 A1* | 1/2012 | Johnson | A63F 13/60 463/43 |
| 2012/0028714 A1 | 2/2012 | Gagner et al. | |
| 2012/0142429 A1 | 6/2012 | Muller | |
| 2012/0150950 A1 | 6/2012 | Osann, Jr. et al. | |
| 2012/0302336 A1 | 11/2012 | Garza et al. | |

FOREIGN PATENT DOCUMENTS

| | | |
|---|---|---|
| JP | 2001162039 A * | 6/2001 |
| JP | 2006-031670 A | 2/2006 |
| WO | WO-9750251 A1 | 12/1997 |
| WO | WO-2008/052254 A1 | 5/2008 |

* cited by examiner

SYSTEMS AND METHODS FOR GENERATING VIDEO HINTS FOR SEGMENTS WITHIN AN INTERACTIVE VIDEO GAMING ENVIRONMENT

CROSS-REFERENCE TO RELATED APPLICATION(S)

This application is a continuation of U.S. patent application Ser. No. 13/170,755, filed Jun. 28, 2011, now U.S. Pat. No. 8,628,423 issued Jan. 14, 2014, which is hereby incorporated by reference herein in its entirety.

BACKGROUND

Traditional interactive video game systems encompass stand-alone software applications with which the user can interact to progress through a particular storyline. These traditional interactive video game systems have a predefined program source code and storyline where the set of outcomes based on a given set of player actions in the game is limited by the program source code and updates or expansion packs to the program source code.

Players of these traditional interactive video game systems oftentimes reach a segment that the players are unsure how to complete. The players must manually search through various websites or purchase hint books to learn the key to completing the segment. Finding the right set of hints for the precise segment of the interactive video game system is a tedious process. Also, even after locating the appropriate hints, the hints may be difficult to understand and use within the interactive video game systems.

SUMMARY OF THE INVENTION

Accordingly, systems and methods for generating video hints for segments within an interactive video gaming environment are provided in accordance with various embodiments of the present invention.

In some embodiments, systems and methods for generating media asset hints for a player with an interactive video gaming environment are provided. In some implementations, a plurality of videos may be received, at a remote server, from a plurality of users. Each of the plurality of videos includes a hint that corresponds to a different one of a plurality of segments within the interactive video gaming environment. In some implementations, a first of the plurality of videos may be received from a first of the plurality of users. The first of the plurality of users may provide an input identifying the first video as corresponding to a first of the plurality of segments. In some implementations, an operator at the remote server reviews content of the received videos to determine which of the plurality of segments correspond to the hint in the respective video.

In some implementations, the received plurality of videos are stored at the remote server. In some implementations, one of the plurality of videos is a live video feed received from one of the users in real-time and is provided to the player as a live video feed in real-time.

In some embodiments, an action relating to game play in the interactive video gaming environment may be received locally or by the remote server. The action may be a request for a hint made by the player during game play of a segment of the interactive video game. In some implementations, the action may be automatically generated and transmitted to the remote server based on a determination that the player violated a rule of the interactive video game. In some implementations, the action may include at least one of receiving from the player a response to an inquiry or question provided during the game play, receiving an indication that the player completed a segment or stage of the interactive video gaming environment, receiving a request from the player for a clue pertaining to the segment or stage of the interactive video gaming environment, and receiving an indication that the player reached or failed to reach a segment of one of the plurality of levels of the interactive gaming environment. In some implementations, the remote server may determine whether the action corresponds to a media asset with a hint associated with the segment of the video game corresponding to the received action.

In some embodiments, the remote server or local user/player equipment may maintain a database for the interactive video gaming environment that includes entries that define the different segments within the interactive video gaming environment that correspond to the plurality of videos. In some implementations, the remote server may cross-reference the current segment of the game play with the entries in the database to determine whether any segments in the database correspond to the current segment. In some embodiments, the remote server may determine the action is not associated with one of the plurality of segments. In response to this determination, the remote server may generate an indication for provision to the plurality of users requesting a media asset associated with the one of the plurality of segments. In some implementations, the indication may include criteria for hints associated with the one of the plurality of segments. In some implementations, the remote server may receive a second plurality of videos corresponding to the one of the plurality of segments based on the generated indication and select a portion of the second plurality of videos for provision to the player based on the one of the plurality of segments.

In some implementations, the local user/player equipment may cross-reference the current segment of the game play with the entries in a local database stored on the user/player equipment to determine whether any segments in the database correspond to the current segment. In some embodiments, the local user/player equipment may determine the action is not associated with one of the plurality of segments. In response to this determination, the local user/player equipment may generate and transmit to the remote server an indication for provision to the plurality of users requesting a media asset associated with the one of the plurality of segments. In some implementations, the indication may include criteria for hints associated with the one of the plurality of segments.

In some embodiments, in response to determining the action is associated with one of the plurality of segments, the remote server may select one of the plurality of videos that includes the hint that corresponds to the one of the plurality of segments associated with the action. In some embodiments, in response to the local user/player equipment determining the action is associated with one of the plurality of segments, the local user/player equipment may transmit an indication to the remote server identifying the segment associated with the action and requesting one of the plurality of videos that includes the hint that corresponds to the segment associated with the action. The media asset with the hint may be a video, audio, image, and/or graphic created by another user of the interactive video game and indicated by the user as corresponding to a given segment of the game. In some implementations, the local user/player equipment or remote server may determine whether the selected media asset hint has been previously provided or made available to the player. When the media asset hint has previously been provided or made available to the player, the local user/player equipment or remote server may select an alternate equivalent media asset hint that has not been made available or provided to the player. The remote server may transmit or make available the selected media asset hint to the player who submitted the action.

In some embodiments, each of the media assets with hints stored on the remote server may be associated with a measure of quality. The measure of quality may include image resolution, type or particular author of the media asset, length, popularity the videos among a community, content quality of the videos, originality of the videos, and/or rarity of the videos. In some implementations, the remote server may determine what level of authorization the player has (e.g., what level within the interactive video gaming environment the player is in or what type of package of the gaming environment the player is using). The remote server may select a media asset with a hint based on the level of authorization the player has. In particular, the remote server may select a media asset with a hint having a high measure of quality when the player has one level of authorization (e.g., the user is in or above level 6 out of 10 in the game). Similarly, the remote server may select a media asset with a hint having a low measure of quality when the player has different lower level of authorization (e.g., the user is in or below level 5 out of 10 in the game).

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
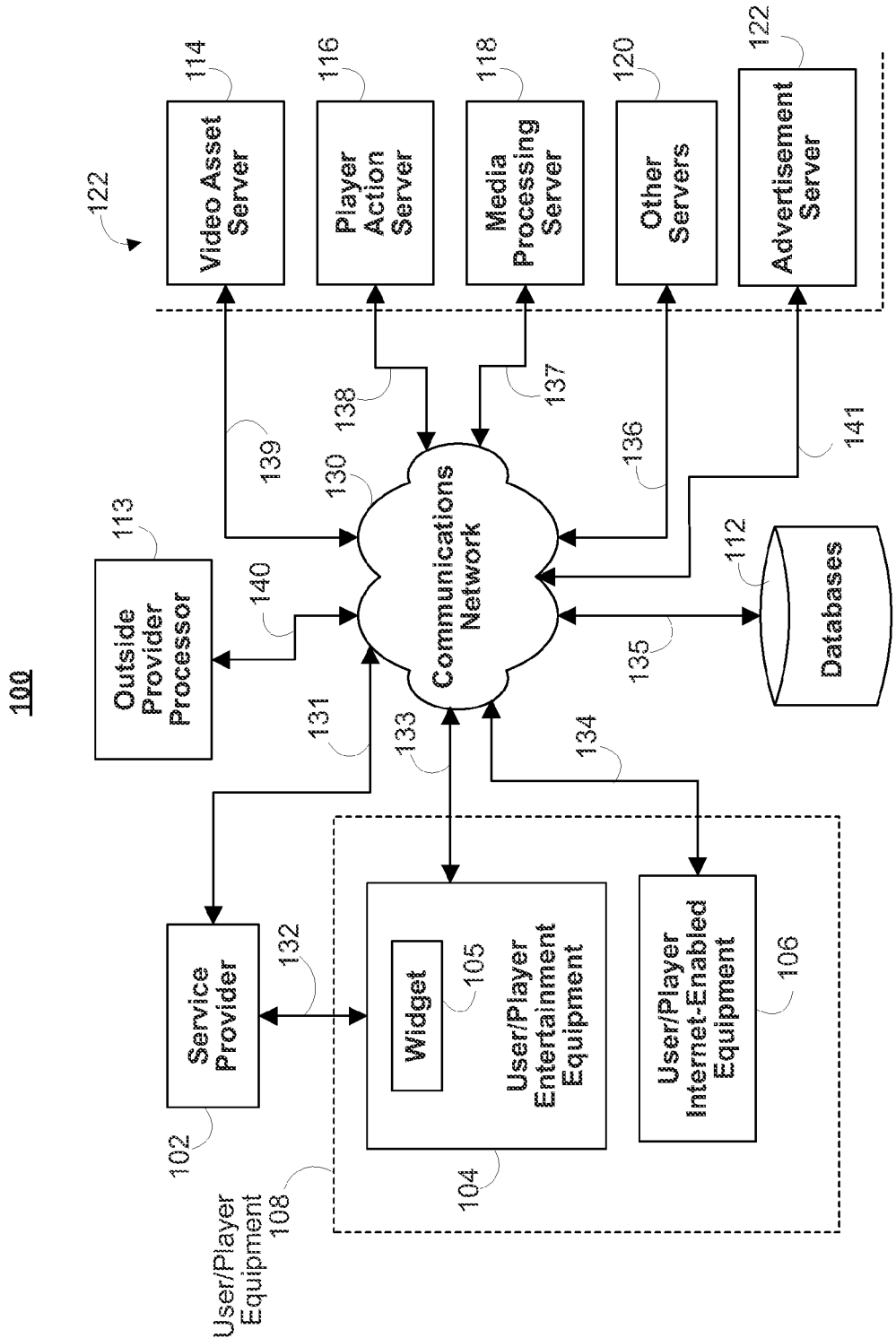
FIG. 1 illustrates an example of a system for transmitting video hints for segments within an interactive video gaming environment in accordance with some embodiments of the present invention.

An interactive video gaming environment is an entertainment application that is used by users and players. In particular, the video gaming environment may be an electronic game that involves interaction with a user interface to generate visual feedback on a video display device. The game may be divided into multiple segments where completion of one segment may be required to reach the next segment in a sequence. The segments may each include a predefined goal or objective that the player needs to accomplish or achieve to complete the segment. The segments may progressively become more difficult (e.g., the objectives may be more challenging to complete) as the player advances to subsequent segments in the sequence. Each segment may be a particular level within the video game, a section of a plurality of sections within a given level of the video game, and/or may encompass a predetermined objective that needs to be completed at a certain point in the video game.

The interactive video gaming environment may be provided in whole or in part at an arcade, at home on a television or personal computer, on a mobile computing device that can execute software applications, a mobile phone, and as a handheld portable game. The interactive video gaming environment may be packaged in large consoles, game packs that can only be played on the same manufacturer's hardware (i.e., Nintendo, Sega Genesis, and Sony PlayStation), applications designed for mobile phone operating systems (e.g., ANDROID applications or IPHONE applications) and as CD-ROMs, DVDs or other permanent or temporary removable storage medium. The interactive video gaming environment is made up of a program or software that instructs processing circuitry to display specific game's visual and audio effects and receive various inputs/responses from a user or player. In some embodiments, the interactive video gaming environment may be implemented as a widget on a television, user equipment device or other suitable media equipment device. Interactive video gaming environment may be referred to above and below interchangeably with interactive gaming environment, video game, electronic gaming environment, electronic interactive gaming environment, electronic interactive video gaming environment, electronic interactive video game, media gaming environment, interactive media gaming environment, interactive game, or any combination thereof.

Widgets are applications (i.e., collections of instructions executable by a processor) that provide information from the Internet and/or otherwise remotely accessible servers (hereinafter "remote servers") to a user. A widget may provide this information through web services and/or using any suitable communication protocol (e.g., TCP/IP, IPTV, etc.). Widgets may also perform local processing tasks, such as guiding a player through the interactive video gaming environment, receiving player actions or user inputs, and generating, providing and/or displaying reward and penalty media assets or media content (e.g., video assets of other users or audio assets of other users) to the player. These widget capabilities, as well as additional widget functionality, will be described in greater detail below.

As referred to herein a media asset categorized as a "reward" is a media asset that includes content desirable to the player that encourages the player to provide an action that deserves a reward in the future and/or provides positive reinforcement as to the previous action performed by the player. As referred to herein a media asset categorized as a "penalty" is a media asset that includes content undesirable to the player that discourages the player from providing an action that deserves a penalty in the future and/or provides negative reinforcement as to the previous action performed by the player.

A widget may run on a television, user equipment device associated with a television, and/or other user equipment devices capable of providing media to a user (e.g., laptop, a mobile phone, e-reader, camera, computer, mobile device, or video player). Television widgets are widgets that run strictly on the hardware platform (e.g., control circuitry) of a television. Typically, television widgets have limited interactions with external user equipment devices and databases, such as set top boxes and third party servers. It will be understood that where the below description refers to a widget or widgets, the term is inclusive of television widgets and other applications with widget-type functionality. For example, a widget may include a JAVA applet executable on a mobile device or any other software application executable on the mobile device (e.g., iPhone application or Android application). JAVA is a registered trademark owned by Sun Microsystems, Inc. In some implementations, the widget may be downloaded or received from a remote server to the mobile device over an open market for free or for a fee from an application store (e.g., marketplace or app store) which is hosted by a remote server. Similarly, the interactive video gaming environment or portions of the interactive video gaming environment may be downloaded or received from a remote server to the mobile device over an open market for free or for a fee from an application store (e.g., marketplace or app store) which is hosted by the remote server.

It should be understood that although the interactive video gaming environment is described in the context of being implemented using a widget running on a media equipment device, the interactive video gaming environment may be implemented in whole or in part using any suitable software application that is executed on a suitable device. In addition, one user or player may use the interactive video gaming application that is implemented using a widget on one type of user equipment device while another user or player may use the interactive video gaming application that is implemented using software application on another type of device such as a mobile computing device (e.g., cellular telephone). The various implementations and means of accessing the interactive video gaming environment are discussed in greater detail in connection with FIGS. 3a-c.

In accordance with some embodiments of the present invention, a widget may be used to generate and display an interactive screen of the interactive video gaming environment and may be used to receive inputs from a user or player, transmit those inputs to a remote video game server and receive data from the video game server or other servers associated with the interactive video gaming environment. The player may access the widget on a player equipment device (or player equipment) to use the screen of the interactive video gaming environment. For example, the screen may be a welcome screen with game play instructions, a screen that has various control options (e.g., capture image or video content), a screen of one of the levels of the game allowing the user to navigate through the level, a screen that displays a question or query for the user to answer, or any other screen shown and described in connection with FIGS. 3-5. In some implementations, the widget may communicate with an internal or external gaming database or server to determine the player's position (e.g., the state of game play of a given player) in the interactive gaming environment. Based on the player's position, the widget may generate the appropriate display screen or transmit/receive corresponding data from the video game server.

In some embodiments, the player may interact with the interactive screen of the widget by way of player actions. A player action may include at least one of receiving a video from the player as part of the game play, receiving a request from the player for a clue pertaining to the segment or stage of the interactive video gaming environment, receiving from the player a response to an inquiry or question provided during the game play, receiving an indication that the player completed a segment or stage of the interactive video gaming environment, receiving an indication that the player reached or failed to reach a segment of one of the plurality of levels of the interactive gaming environment, or any other input received from the player that affects game play of the interactive video gaming environment. The player action may be transmitted to a remote server (e.g., video game server) by the widget or the player equipment. As defined herein, the term "level" means certain access rights or game playing space within the video gaming environment available to the player during the course of completing a discrete objective of the video gaming environment. In addition, the term "level" may also refer to a degree of difficulty within the video gaming environment, where the degree of difficulty may increase or decrease for each level within the video gaming environment. As defined herein, the term "segment" or "stage" means a discrete objective or task that requires completion within a level in order to advance to the next objective or task within the video gaming environment.

In some embodiments, users may interact with one of the interactive screens generated by a widget of user equipment device to transmit media assets (e.g., audio and/or video) to, or receive player actions from, the video game server (e.g., remote server). Media assets may include conventional television programming or video (provided via traditional broadcast, cable, satellite, Internet, or other means), as well as pay-per-view programs or video, on-demand programs or video (as in video-on-demand (VOD) systems), Internet content (e.g., streaming media, downloadable media, Webcasts, etc.), and other types of media or video content. The widget may store the media asset on the remote server or transmit the media asset in real-time, live format to the player (e.g., in a peer-to-peer manner or through the remote server). In particular, the users may generate a media asset that includes a hint for accomplishing a segment within the interactive video game. In some implementations, the users may generate the media asset using the user equipment device (e.g., a video camera or microphone coupled to or embedded within the user equipment device, such as a video camera positioned in a plane of the display screen of the user equipment device—front-facing video camera). The remote server may store the received media asset in a database with indications of which segment the media assets correspond to. The database may be in a same location as the remote server, remote from the remote server and the user equipment device, or within the remote server. As used herein, the term "hint(s)" refers to information that provides a walkthrough to someone of how to win or accomplish a task within an interactive video gaming environment. The hint(s) may guide the player to accomplishing the goal of the segment of the interactive game without completely spoiling the puzzle solving. The hint(s) may also refer to information that explains one or more rules pertaining to a segment of a game (e.g., an explanation of a rule that applies in a given situation in a sporting event game such as a golf game). In particular, the hint(s) may provide instructions pertaining to a given situation. For example, the hint may provide an explanation of what rules apply when the player of a golf game is in a situation such as when the golf ball is stuck in the sand.

In some embodiments, each of the media assets received by the remote server from the users may be associated with a particular measure of quality. For example, the measure of quality may include popularity of the content of the media asset (e.g., popularity of a celebrity in the media asset, where the measure of quality is greater for celebrities that are more popular). The measure of quality may include picture resolution, length of the videos, popularity the media asset among a community, content quality of the media asset, originality of the media asset, rarity of the media asset, or any other suitable value that is attributed to the media asset that can be used to indicate that one media asset is "better" or more valuable than another media asset. The remote server may store the received media asset in a database with indications of the quality associated with each media asset. The database may be in a same location as the remote server, remote from the remote server and the user equipment device, or housed within the remote server.

It should be understood that any reference to "remote server" made above and below refers to any combination of video asset server, player action server, media processing server, advertising server, or any other server necessary for implementing and/or coordinating operation of the video gaming environment. Video asset server, player action server, media processing server, advertising server, or any other server necessary for implementing and/or coordinating operation of the video gaming environment may each be in one location, remote from each other, housed within the same device, or any combination thereof. Any reference above or below to the term "automatically" is synonymous with the phrase "without user input" or "without further user input."

In some embodiments, the remote server may transmit or make available a received player action to a community or group of users (hereinafter "users"). In some implementations, the users do not include the player. The users may access a widget or a screen of the interactive video gaming environment on their own user equipment device (e.g., by navigating to an appropriate website), receive one or more player actions from one or more players and assign ranks to the received actions. The remote server may transmit a reward or penalty media asset provided by a user to the player based on the player action. Systems and methods for providing reward and penalty media assets to players are described in greater detail in David D. Chung et al. U.S. patent application Ser. No. 13/118,717, filed May 31, 2011; David D. Chung et al. U.S. patent application Ser. No. 13/118,712, filed May 31, 2011; and David D. Chung et al. U.S. patent application Ser. No. 13/118,703, filed May 31, 2011, each of which is hereby incorporated by reference herein in its entirety.

In some embodiments, the remote server may prevent users or players from requesting a hint for completing a segment within a video game before the users or players generate and transmit to the remote server a predetermined number of video assets that include hints for segments the users or players completed. For example, upon receiving a request from a player to receive a hint in the video game, the remote server may determine whether the player has submitted a predetermined number of media assets that include hints for the video game (e.g., whether the player submitted more than five videos with hints). If the user has not submitted more than the predetermined number of media assets with hints, the remote server may request that the player transmit a quantity or a certain number (e.g., the predetermined number) of media assets with hints. Afterwards, the remote server may allow the user to receive a hint for the current segment of the video game which the player is in. The terms "action" and "player action" are used interchangeably throughout but should be understood to have the same meaning.

In each case, discussed above and below, where the remote server transmits the media asset that includes the hint for completing the segment of the video game to the player, instead of transmitting the entire contents of the media asset that includes the hint to the player, the remote server may transmit a communication that includes a link to the media asset. The player may select the link and navigate to a location (e.g., local storage location or remote storage location on another server) to retrieve the contents of the media asset.

In some embodiments, after selecting a media asset and before transmitting the selected media asset to the user, the remote server may determine whether the player has previously accessed the media asset. When the player has previously accessed the media asset, the remote server may select a different media asset with the hint that is associated and corresponds to the same segment of the video game as the previously selected media asset for transmission to the player in place of the previously accessed media asset. As referred to above and below, a media asset having a hint is synonymous with each of a media asset that includes a hint, a media asset that is associated with a hint, a media asset that has a hint, media asset hint, and any variation thereof.

FIG. 1 illustrates an example of a system 100 for transmitting videos of hints for current player segments within an interactive video gaming environment (e.g., using a widget 105) in accordance with some embodiments of the present invention. Widget 105 may be resident in user/player entertainment equipment 104 within user/player equipment 108. Alternatively, widget 105 may be resident in user/player internet-enabled equipment 106 within user/player equipment 108. User/player equipment 108 may include both user/player entertainment equipment 104 and user/player internet-enabled equipment 106.

The term "player" refers to the person or viewer performing a particular action or interacting with the interactive video gaming environment (e.g., requesting a hint for assistance in completing a segment of a video game). The term "user" or "users" refers to other players, viewers or persons that contribute to game play of the player in the interactive video gaming environment (e.g., creating the media assets containing the hints for various segments of the video game). The player can sometimes become a user when the player is contributing to game play of another one of the users. The player and the users may communicate, perform and receive each other's actions or contributions in the interactive video gaming environment system 100. In particular, each player or user may be associated with particular user/player equipment 108 that executes or accesses the interactive video gaming application (e.g., using widget 105 or using a computing device that accesses a website on the Internet).

Widget 105 may be a software application that is downloaded or installed, for instance, in user/player entertainment equipment 104. Widget 105 may be executed by an interpreter or virtual machine running, for example, on control circuitry of user/player entertainment equipment 104 (e.g., processing circuitry 206 of FIG. 2). Widget 105 may allow users to interact with web services while watching television, media assets or other video asset or program on user/player entertainment equipment 104. In some embodiments, widget 105 may run on the Yahoo! Connected TV platform, and user/player entertainment equipment 104 may be a television manufactured with built-in support for widget 105 (e.g., from one of Samsung Group, Sony Group, LG Electronics, or Vizio).

Figure 2:
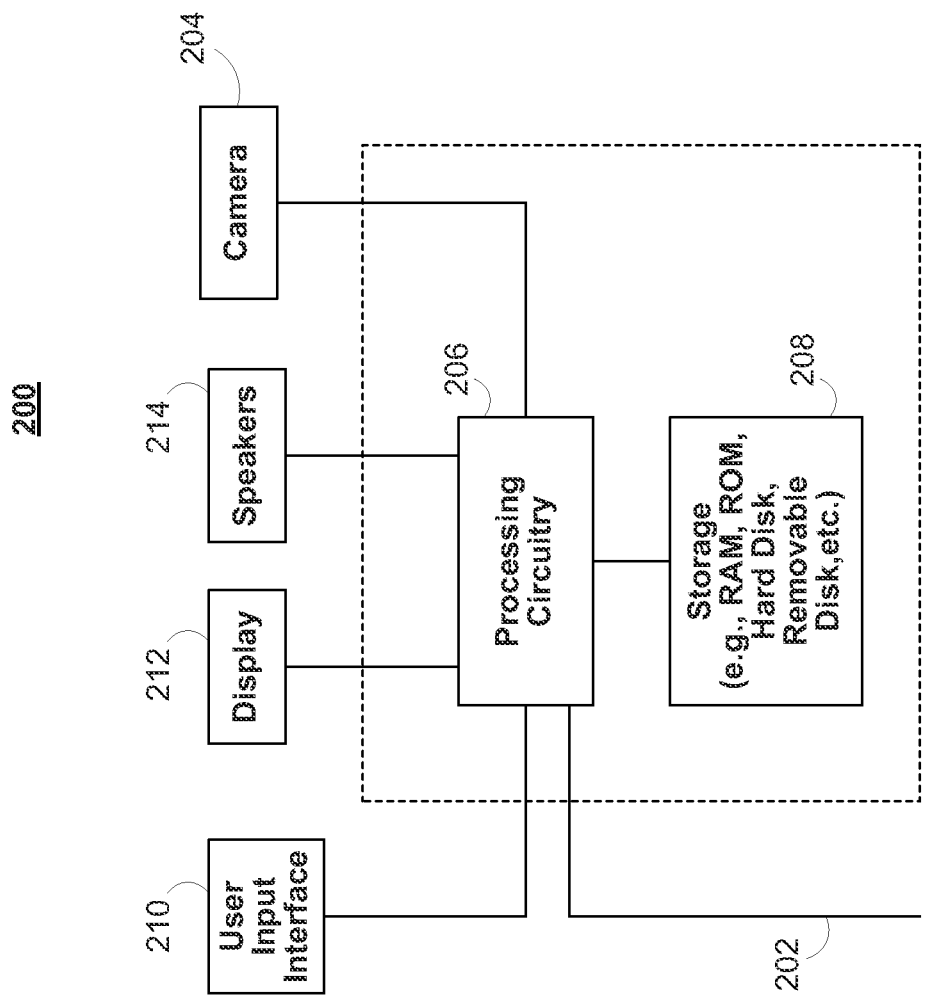
FIG. 2 illustrates an example of a user equipment device that may be used to implement the interactive video gaming environment in accordance with some embodiments of the present invention.

In some embodiments, widget 105 may be packaged and/or encoded in the ETV Binary Interchange Format (EBIF), received by processing circuitry 206 of FIG. 2 as part of a suitable feed, and interpreted by a user agent running on processing circuitry 206. For example, widget 105 may be an EBIF application and user/player entertainment equipment 104 may be a set-top box. In other embodiments, the widget may be defined by a series of JAVA-based files that are received and run by a local virtual machine or other suitable middleware executed by processing circuitry 206 of FIG. 2. In yet other embodiments (e.g., those employing MPEG-2 or other digital media encoding schemes), the widget may be encoded and transmitted in an MPEG-2 object carousel with the MPEG audio and video packets of a program. In this embodiment, widget 105 may be an OCAP widget (e.g., a tru2way widget), and user/player entertainment equipment 104 may be a set-top box.

In other embodiments, user/player entertainment equipment 104 may include user television equipment, user computer equipment, a wireless user communication device, an e-reader, a set-top box, an ipad, a touch screen tablet device, a media equipment device, mobile telephone, or any other type of user entertainment equipment for accessing media, such as a non-portable or portable gaming machine.

In some embodiments, the user may enter settings information, such as user profile information, user login information, and user permissions information, into user/player internet-enabled equipment 106. Assuming that the user sets their permissions such that user profile information may be stored externally, the user profile information may be stored in a remote data store (e.g., one of databases 112). Otherwise, the user profile information may be stored in a data store within user/player equipment 108 (e.g., storage 208 of FIG. 2). User/player internet-enabled equipment 106 may include a set-top box, an integrated receiver decoder (IRD) for handling satellite television, a PC, a laptop, a tablet, an e-reader, a WebTV box, a personal computer television (PC/TV), a PC media server, a PC media center, an ipad, a touch screen tablet device, a mobile telephone, a mobile entertainment device, a media equipment device, a television set, a digital storage device, a DVD recorder, a video-cassette recorder (VCR), a local media server, wireless user communications devices, portable exercise equipment, stand-alone exercise equipment or any other suitable internet-enabled or non-internet-enabled equipment. WEBTV is a trademark owned by Microsoft Corp. Wireless communications devices may include PDAs, a mobile telephone, a smartphone, a portable music player, a portable gaming machine, an ipad, a touch screen tablet device, or other wireless devices.

In system 100, there is typically more than one user/player equipment 108 but only one is shown in FIG. 1 to avoid overcomplicating the drawing. In addition, each user may utilize more than one type of user/player equipment 108 (e.g., a user may have a television set and a computer) and also more than one of each type of user/player equipment 108 (e.g., a user may have a PDA and a mobile telephone and/or multiple television sets).

It should be noted that, with the advent of television tuner cards for PC's, WebTV, and the integration of video into other user equipment devices, the lines have become blurred when trying to classify a device as a user/player entertainment equipment 104 or a user/player internet-enabled equipment 106. In fact, in some embodiments, widget 105 may run on user internet-enabled equipment 106 in addition to user entertainment equipment 104, and settings information may be entered using either type of user equipment. Each user equipment 108 may utilize at least some of the system features described below with respect to FIG. 2 and, as a result, include flexibility with respect to the type of interactive applications available on the device. For example, user/player entertainment equipment 104 may be internet-enabled allowing for access to settings information through the Internet, while user/player internet-enabled equipment 106 may include a tuner allowing for access to television programming, and both may run widget 105 together or separately. It should therefore be understood that, in some embodiments, user/player entertainment equipment 104 and user/player internet-enabled equipment 106 are integrated components of a single user device (i.e., user/player equipment 108).

Widget 105 may have the same display layout and/or execution parameters on the various types of user equipment or may be tailored to the display and/or processing capabilities of the user equipment. For example, on user/player entertainment equipment 104, widget 105 may run as a persistent (e.g., always-running) application. In another example, the widget display screens may be scaled down for wireless user communications devices.

In addition to widget 105, user/player equipment 108 may access and/or run a media guidance application that provides an interface that allows users to efficiently navigate through media selections and easily identify media content that they may desire. Media guidance applications may take various forms depending on the media for which they provide guidance. One typical type of media guidance application is an interactive television program guide or interactive media guide. Interactive television program guides (sometimes referred to as electronic program guides or EPGs) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs, and other types of media content (e.g., audio content). Moreover, media guidance applications allow users to navigate among and locate content related to the media content for which guidance is provided including, for example, video clips, audio assets, articles, advertisements, chat sessions, games, etc. Media guidance applications may be provided as on-line applications (i.e., provided on a web-site), or as stand-alone applications or clients.

The aforementioned settings information entered by the user may be consistent across in-home devices and remote devices. Settings include those user profile, user login, and user permission settings described herein, as well as media favorites, media guidance settings, display preferences, and other desirable settings. For example, if a user sets a channel as a favorite on, for example, the web site www.tvguide.com on their personal computer at their office, the same channel would appear as a favorite on the user's in-home devices (e.g., in a media guidance application running on user entertainment equipment 104). Therefore, changes in settings made on one user equipment device can change the user's experience on another user equipment device, regardless of whether they are the same or a different type of user equipment device. In addition, the changes made may be based on settings input by a user, as well as monitored user activity (e.g., activity monitored by widget 105).

In some embodiments, user profile information may include data from monitoring a user's activity. For example, user interaction with widget 105, a media guidance application, and/or any other suitable application or feature (e.g., running on or displayed by user/player equipment 108) may be monitored and recorded.

User profile information may also include user-identifying information (e.g., the user's name), user viewing habits, user demographic information, or any other suitable data relating to and/or describing a user. User profile information may be stored within user/player equipment 108 and/or at a remote location (e.g., databases 112).

The user equipment devices of user/player equipment 108 may be coupled to communications network 130. Namely, user/player entertainment equipment 104 and user/player internet-enabled equipment 106 may be coupled to communications network 130 using communications paths 133 and 134, respectively. Communications network 130 may be one or more networks including a local area network, a wide area network, the Internet, a mobile phone network, peer-to-peer network, mobile device (e.g., Blackberry) network, cable network, public switched telephone network, or other types of communications networks. BLACKBERRY is a service mark owned by Research In Motion Limited, Corp. Paths 131-141 may separately or together include one or more communications paths, such as, a satellite path, a fiber-optic path, a cable path, a path that supports Internet communications (e.g., TCP/IP, IPTV, etc.), peer-to-peer connections, free-space connections (e.g., for broadcast or other wireless signals), or any other suitable wired or wireless communications path or combination of such paths. Communications with user/player equipment 108 may be provided by one or more of these communications paths, but are shown as single paths in FIG. 1 to avoid overcomplicating the drawing. Communications between multiple user/player equipment 108 may be provided by one or more of these communications paths, but are shown as single paths in FIG. 1 to avoid overcomplicating the drawing or may be handled through an intermediate source, such as outside provider processor 113.

Although communications paths are not drawn between various user/player equipment 108 (e.g., between user/player entertainment equipment 104 and user/player internet-enabled equipment 106), these devices may communicate directly with each other through communications network 130 and/or via short-range point-to-point communication paths, such as USB cables, IEEE 1394 cables, wireless paths (e.g., Bluetooth, infrared, IEEE 802-11x, ZigBee, Radio Frequency for Consumer Electronics (RF4CE), etc.), or other short-range communication or Low-Rate Wireless Personal Area Networks (LR-WPANs) communication via wired or wireless paths. BLUETOOTH is a certification mark owned by Bluetooth SIG, INC. User/player equipment 108 may also communicate with each other indirectly, e.g., through an indirect path via communications network 130.

In some embodiments, widget 105 is invoked expressly by the user, for instance, in response to an indication or selection received from the user (e.g., via user input interface 210 of FIG. 2). In other embodiments, widget 105 is invoked automatically, for example, upon selection or display of a video asset or request to access or use the interactive video gaming environment.

In response to invocation, widget 105 may send information to service provider 102 over communications link 132 and/or to outside provider processor 113 (hereinafter "OPP 113") over communications network 130 (including, e.g., paths 133 and 140). In some embodiments, communications with service provider 102 and OPP 113 may be exchanged over one or more communications paths, but are shown as two separate paths in FIG. 1 to avoid overcomplicating the drawing. In addition, there may be more than one of each of service provider 102 and OPP 113, but only one of each is shown in FIG. 1 to avoid overcomplicating the drawing. As will be described, the information that widget 105 sends to these sources may be as little as an identification number, an indication of the channel or video asset the user is watching, and/or an indication of a particular interactive video gaming environment, an identification of the segment or stage within the interactive video game the player is currently in, and/or action in the interactive video gaming environment selected by the user.

Service provider 102 may include one or more types of media distribution equipment including a television distribution facility, cable system head-end, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Service provider 102 may be the originator of media content, e.g., a television or internet broadcaster, a Webcast or streaming video provider, a digital cable service provider, a bundled communication (e.g., Internet, telephone, and TV) provider such as Verizon FiOS, a provider of digital on-demand media, a cellular telephone service provider, etc. Alternatively, service provider 102 may not be the originator of media content, e.g., an on-demand media content provider, an Internet provider of video content of broadcast programs for downloading or streaming, etc. Service provider 102 may be the central source from which information pertaining to the interactive video gaming environment is received by widget 105 or user/player equipment 108. For example, service provider 102 (e.g., application store) may store the program code (e.g., the application or app) for executing the interactive video gaming environment on a particular user/player equipment 108 (e.g., an iPhone or iPad). The user may be required to purchase the program code to download and access the interactive video gaming environment on user/player equipment 108.

Service provider 102 may include cable sources, satellite providers, on-demand providers, Internet providers, or other providers of media content or an interactive video gaming environment. Service provider 102 may also include a remote media server used to store different types of media content (including video content selected by a user, for example, on a website), actions performed by a player in the interactive video gaming environment, or media or videos provided as rewards or penalties by users of the interactive video gaming environment in a location remote from any of the user equipment devices. As used herein, the term broadcaster may refer to an analog or digital signal provider, a cable network, a satellite provider, an Internet website, a cellular telephone network provider, an Internet content provider, or any such provider that may distribute media content such as video assets or interactive video gaming environment information to user/player equipment 108. As used herein, the terms broadcaster's website or media broadcaster's website may refer to one or many web addresses, server addresses, databases, or other sources of media information or media content, specific to a particular broadcaster, and associated with Internet websites or other content providers. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Service provider 102 may also provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips or segments, etc.), on-demand information, and any other type of guidance data that is helpful for a user to navigate among and locate desired media asset selections.

OPP 113 may include a data processor (e.g., any suitable computer server equipment) operated by an outside provider (e.g., the provider of widget 105) that can act as a central hub for communications between widget 105 running on user/player equipment 108, service provider 102, various user/player equipments 108 and third party servers 122. As will be discussed, third party servers 122 may include video asset server 114, player action server 116, media processing server 118, advertisement server 122, and other servers 120. In some embodiments, OPP 113 may store and retrieve information from databases 112. Databases 112 may be any suitable computer server equipment and/or any suitable data storage device.

In some embodiments, OPP 113 may act as a clearinghouse of information for providing data and/or other interactive features to the user of widget 105. To achieve this function, OPP may exchange information with third party servers 122 via communications network 130 and/or communication links 136-140. For example, OPP 113 may receive a video asset from video asset server 114 and provide the video asset to user equipment 108 via communication network 130. Alternatively, user equipment 108 may receive the video asset directly from video asset server 114. As another example, OPP 113 may transmit a request for a video asset or a portion of a video asset (e.g., a specific frame of the video asset) to video asset server 114. Video asset server 114 may fulfill the request by providing the video asset or portion of the video asset to the OPP 113 via communications network 130. Alternatively, video asset server 114 may fulfill the request by providing the video asset or portion of the video asset to the OPP 113 from databases 112 via communications network 130.

In some embodiments, OPP 113 may receive, from user/player equipment 108, a player action relating to game play in the interactive video gaming environment. OPP 113 may store the received player action in player action server 116. OPP 113 may determine whether the received action corresponds to a media asset that includes a hint for a particular segment of the video game. For example, OPP 113 may receive a request from a player to receive a hint for completing a segment of the interactive video game. In response, OPP 113 may determine whether video asset server 114 includes a media asset with a hint that corresponds to a segment or stage identified by the player request. OPP 113 may in response to determining that video asset server 114 includes the media asset with the hint, retrieve from video asset server 114 (either randomly or on a last recently stored basis) the media asset that includes the hint for the corresponding segment. After determining that the player has sufficient access rights (e.g., that the player submitted a predetermined number of media assets that include hints), OPP 113 may forward the media asset retrieved from video asset server 114 to the requesting player.

In some embodiments, OPP 113 may host a website associated with the interactive video gaming environment. Player/user equipment 108 may access the website to allow the user or player to submit player actions, access the interactive video gaming environment, submit one or more media assets with hints and/or request a media asset with a hint for a particular segment of the video game the player is in. Any functionality of the applications provided by user/player equipment 108 described herein may be provided in a similar manner by accessing a website online using a web browser or other website accessing application running on user/player equipment 108.

Video asset server 114 may include any suitable computer server equipment capable of broadcasting, storing or delivering media content (e.g., media assets received from various users of the interactive video gaming environment). Such video asset servers may include traditional head-ends, such as television broadcast stations, and may include Internet servers configured to deliver content upon request (e.g., on-demand, streaming content, downloadable content). For example, a media asset server may be one belonging to Blockbuster Video, Hulu, Netflix, Apple iTunes, or Amazon.com. In some embodiments, video asset server 114 may send inventory and other information to OPP 113 via communications network 130. For example, video asset server 114 may send OPP 113 information regarding media content available via video-on-demand or digital download. The inventory information may be provided, for example, to a media guidance application on user equipment 108. The inventory may include information identifying all or some of the media assets available on video asset server that are provided by users of the interactive video gaming application (e.g., using user/player equipment 108). In some embodiments, video asset server 114 may be instructed by OPP 113 to enable a user of one user/player equipment 108 to directly or indirectly connect with a player of another user/player equipment 108 to allow real-time or direct streaming of a media asset (e.g., video asset) from user/player equipment 108 of the user to user/player equipment 108 of the player.

Video asset server 114 may store multiple copies of a particular video asset or media asset where each video asset or media asset copy is associated with a different measure of quality. For example, video asset server 114 may store multiple copies of a video asset where the measure of quality of each copy includes different image qualities, aspect ratios, picture resolutions. Video asset server 114 may associate a class (or set) of videos with a first measure of quality and may associate another class (or set) of videos with a different second measure of quality. The measure of quality of the first class (or set) may be greater than the second class (or set) in that the first class or set may be videos that are longer, more popular among a community, have better content quality, are more original, are better quality, have a greater aspect ratio, have a greater picture resolution or are more rare.

Player action server 116 may include any suitable computer server equipment capable of storing or receiving a media asset, image, video, text, or audio, or any combination thereof. Player action server 116 may receive from user/player equipment 108 an action provided by a player during game play in the interactive video gaming environment. For example, user/player equipment 108 may track which segment within the interactive video game the player is in. User/player equipment 108 may receive an instruction or request from the player to receive a hint video for the current segment of the interactive video game. Alternatively, user/player equipment 108 may automatically generate a request for a hint video after determining that the player is unable to complete the segment (e.g., within a predetermined amount of time or when the player makes a predetermined number of incorrect actions or moves). User/player equipment 108 may transmit, to player action server 116, the request for a video that includes a hint with indication of the current segment the player is in.

In some embodiments, player action server 116 is the same server as video asset server 114 and/or media processing server 118. For example, player action server 116 may receive as the player action a response to an inquiry or question provided during the game play, an indication that the player completed a segment or stage of the interactive video gaming environment, or an indication that the player reached or failed to reach a segment of one of the plurality of levels of the interactive gaming environment. Player action server 116 may communicate with databases 112 to retrieve user profile information and other relevant data for receipt and storage of a player action. Player action server 116 may communicate with databases 112 to determine availability of a media asset that includes a hint corresponding to the segment of the interactive video game associated with the received player action. In response to determining that the media asset that includes a hint corresponding to the segment associated with the received player action is available, player action server 116 may transmit or make available the media asset to user/player equipment 108 for provision or display to the player. In response to determining that the media asset that includes a hint corresponding to the segment associated with the received player action is not available, player action server 116 may generate a request for a media asset that includes the hint corresponding to the segment. Player action server 116 may wait for users of the interactive video game to submit the requested media assets that include the hint corresponding to the segment. After evaluating a predetermined number of the received media assets, player action server 116 may select a best or worst one of the media assets for provision to the player as the media asset that includes the requested hint.

Advertisement server 122 may include any suitable computer server equipment capable of storing and selecting advertisements (e.g., image, video or audio content) that promote an interactive video gaming environment. The interactive video gaming environment being promoted may be different from the interactive video gaming environment being used or accessed by the player (e.g., a different game may be promoted (currently available or that may become available in the future) and may be owned by the same entity as the entity that owns the game being played by the player). The advertisement may promote other features of the interactive video gaming environment (e.g., upgrades, new content or video downloads, etc.), media, pay-per-view media assets, video on-demand media assets, television programming, Internet content, tangible and intangible products, or other suitable information. Advertisement server 122 may be capable of selecting an advertisement that is of a particular length, has particular content or is otherwise related or unrelated to a player action or media asset that is selected for delivery to a player. Advertisement server 122 may store in databases 112 an association between different levels of game play in the interactive gaming environment and advertisements. Advertisement server 122 may select an advertisement based on the association in databases 112 and the level or segment in the game play in which the action is received from the player. In some implementations, each of the levels in the interactive video gaming environment is ordered based on increasing levels of difficulty in the interactive video gaming environment.

Media processing server 118 may include any suitable computer server equipment capable of processing player actions, video assets and advertisements provided respectively from player action server 116, video asset server 114, and advertisement server 122. Processing may include combining media assets that include hints with advertisements stored in advertisement server 122. For example, media processing server 118 may be instructed by OPP 113 to place an advertisement (e.g., video, audio or image) before or at some specified time during playback of the media asset that includes the requested hint so that when the media asset is transmitted for playback to the player, the advertisement is displayed before or at some point during the media asset. Similarly, media processing server 118 may be instructed by OPP 113 to place the advertisement (e.g., video, audio or image) within the content of a video asset so that when the video asset is transmitted for playback to the player, the advertisement is displayed simultaneously with the player action or video asset (e.g., in an opaque, transparent, or partially transparent overlay). Media processing server 118 may also transcode or convert media assets received from one user using one type of media equipment device (e.g., a set-top box) to a form suitable for playback on a different type of media equipment device (e.g., an iPad, a tablet device, or touch screen interface device).

Media processing server 118 may provide the processed video assets and advertisements to widget 105 on user equipment 108 (e.g., through OPP 113). It should be understood that, in some embodiments, media processing server 118 may be the same server as server 114, 122 and/or 116. Media processing server 118 may also communicate with other servers 120, the latter of which may perform some or all of the processing steps.

Other servers 120 may include any suitable computer server equipment not mentioned in the description above. For example, other servers 120 may include image or video processing web sites or applications. In some embodiments, other servers 120 may transmit information to OPP 113 or to widget 105 (on user equipment 108) via network 130.

In some embodiments, video asset server 114, player action server 116, media processing server 118, advertisement server 122 or other servers 120 may respond to requests from OPP 113 to process player actions and/or receive and store user media assets (e.g., videos).

FIG. 2 illustrates an example of generalized user equipment 200 that may be used to implement widget 105 and/or all or a portion of the interactive video gaming environment in accordance with some embodiments of the present invention. User equipment 200 may be substantially the same as, or may be comprised within, user/player equipment devices 104 and 106 of FIG. 1, or user/player equipment 108. User equipment device 200 may receive and send information from service provider 102 and/or OPP 113 (FIG. 1) via input/output (hereinafter "I/O") path 202. I/O path 202 may provide data to processing circuitry 206, which may include processing circuitry 206, camera 204, and storage 208.

I/O path 202 may connect processing circuitry 206 (and specifically processing circuitry 206) to communications network 130 of FIG. 1. I/O functions may be provided by one or more communication paths, but are shown as a single path in FIG. 2 to avoid overcomplicating the drawing.

Processing circuitry 206 may include any suitable processing circuitry 206 such as processing circuitry based on one or more microprocessors, microcontrollers, digital signal processors, programmable logic devices, etc. In some embodiments, processing circuitry 206 executes instructions for widget 105 and/or other applications stored in memory (i.e., storage 208). In client-server based embodiments, processing circuitry 206 may include communications circuitry suitable for communicating with networks or servers.

Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (described in more detail in connection with FIG. 1). In addition, communications circuitry may include circuitry that enables peer-to-peer communication between user equipment devices 200, or communication between user equipment devices 200 located remotely from each other (described in more detail in connection with FIG. 1).

Memory (e.g., random-access memory, read-only memory, or any other suitable memory), hard drives, optical drives, flash drives, optical storage device, or any other suitable fixed or removable storage devices (e.g., DVD recorder, CD recorder, video cassette recorder, or other suitable recording device) may be provided as storage 208 that is part of processing circuitry 206. Storage 208 may include one or more of the above types of storage devices. For example, user equipment device 200 may include a hard drive for a DVR (sometimes called a personal video recorder, or PVR) and a DVD recorder as a secondary storage device. Storage 208 may be used to store various types of media and data described herein, including program information, widget settings, user preferences or profile information, media assets, video assets, player actions, states within the interactive video gaming environment for one or more users, or other data used in operating widget 105 and/or user/player equipment 208. Nonvolatile memory may also be used (e.g., to launch a boot-up routine and other instructions).

Processing circuitry 206 may include video generating circuitry and tuning circuitry, such as one or more analog tuners, one or more MPEG-2 decoders or other digital decoding circuitry, high-definition tuners, or any other suitable tuning or video circuits or combinations of such circuits. For example, control circuitry may include a display driver for driving display 212, any number of buffers (e.g., to hold data to be displayed), and/or switching circuitry (e.g., to select which buffer contains the data to be displayed and/or which buffer should be read by the display driver). Encoding circuitry (e.g., for converting over-the-air, analog, or digital signals to MPEG signals for storage) may also be provided. Processing circuitry 206 may also include scaler circuitry for upconverting and downconverting media into the preferred output format of the user equipment 200. Processing circuitry 206 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive data for widget 105. The circuitry described herein, including, for example, the tuning, video generating, encoding, decoding, scaler, switching, display driver, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc). If storage 208 is provided as a separate device from user equipment device 200, the tuning and encoding circuitry (including multiple tuners) may be associated with storage 208.

A user or player may issue commands to the processing circuitry 206 using user input interface 210. User input interface 210 may be any suitable user interface, such as a remote control, mouse, trackball, keypad, keyboard, touch screen, touch pad, stylus input, joystick, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, light emitting diode (LED) display, plasma display, or any other suitable equipment for displaying visual images. In some implementations, display 212 may be the same device as user input interface 210 (e.g., when user equipment device 200 includes a touch screen interface). Display 212 may include multiple display screens (e.g., one of the front of user equipment device 200 and one of the back of user equipment device 200). In some embodiments, display 212 may be HDTV-capable. Speakers 214 may be provided as integrated with other elements of user equipment device 200 or may be stand-alone units. The audio component of videos and other media content displayed on display 212 may be played through speakers 214. In some embodiments, the audio may be distributed to a receiver (not shown), which processes and outputs the audio via speakers 214.

In some embodiments, user equipment device 200 may include camera 204 which may be capable of capturing high-definition (e.g., HD, SD), three-dimensional (3D), or any other suitable video and/or image content. In the case of 3D video or image capture, camera 204 may include multiple lenses or multiple cameras spaced apart a predetermined distance to capture stereoscopic images that, when viewed by a user with a stereoscopic optical device, appear in 3D. Processing circuitry 206 may activate camera 204 upon receiving a user or player instruction through user input interface 210. Camera 204 may be used to create media content and store the media content in storage 208. In some implementations, camera 204 may be used to transmit live or real-time video and/or audio from a user/player to another user/player. In such circumstances, storage 208 may be avoided by camera 204 or may be used as a buffer to time delay the media content captured by camera 204 before transmitting the media content to another user/player.

Camera 204 may be a front-facing camera that is placed within display 212. This allows the user to face camera 204 while viewing display 212. In some embodiments, camera 204 may include two cameras, one on a front panel of user equipment device 200 and one on a back panel of user equipment device 200. The camera on the front panel of user equipment device 200 may be the front-facing camera that is within display 212 that can take images of the user while the user interacts with display 212. The camera on the back panel of the user equipment device 200 may take images of the user when the user turns user equipment device 200 over and front panel display 212 away from the user.

User equipment device 200 may be a representation of, or implemented within, user equipment 108 of FIG. 1, and may thus run widget 105. Accordingly, camera 204 may be used and/or activated by widget 105. Although OPP 113, service provider 102, databases 112 and servers 122 are drawn separately, they may all be housed in a single device at a single geographical location, multiple devices at the same or different geographical locations and/or on a single integrated circuit coupled to communications network 130.

Figure 3A:
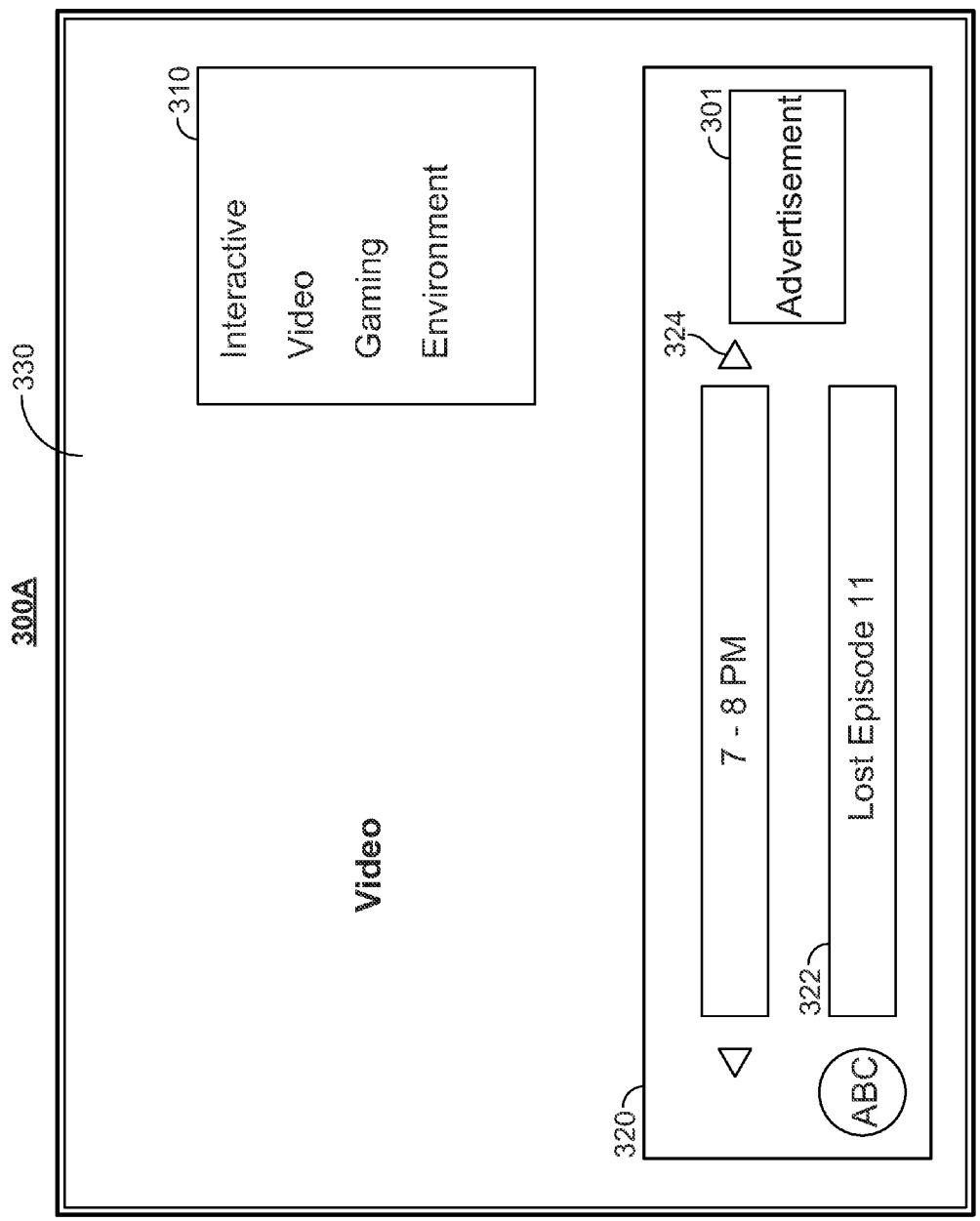
FIGS. 3A-C illustrate exemplary user interfaces that may provide the interactive video gaming environment on various platforms of a user equipment device in accordance with some embodiments of the present invention.
Figure 3B:
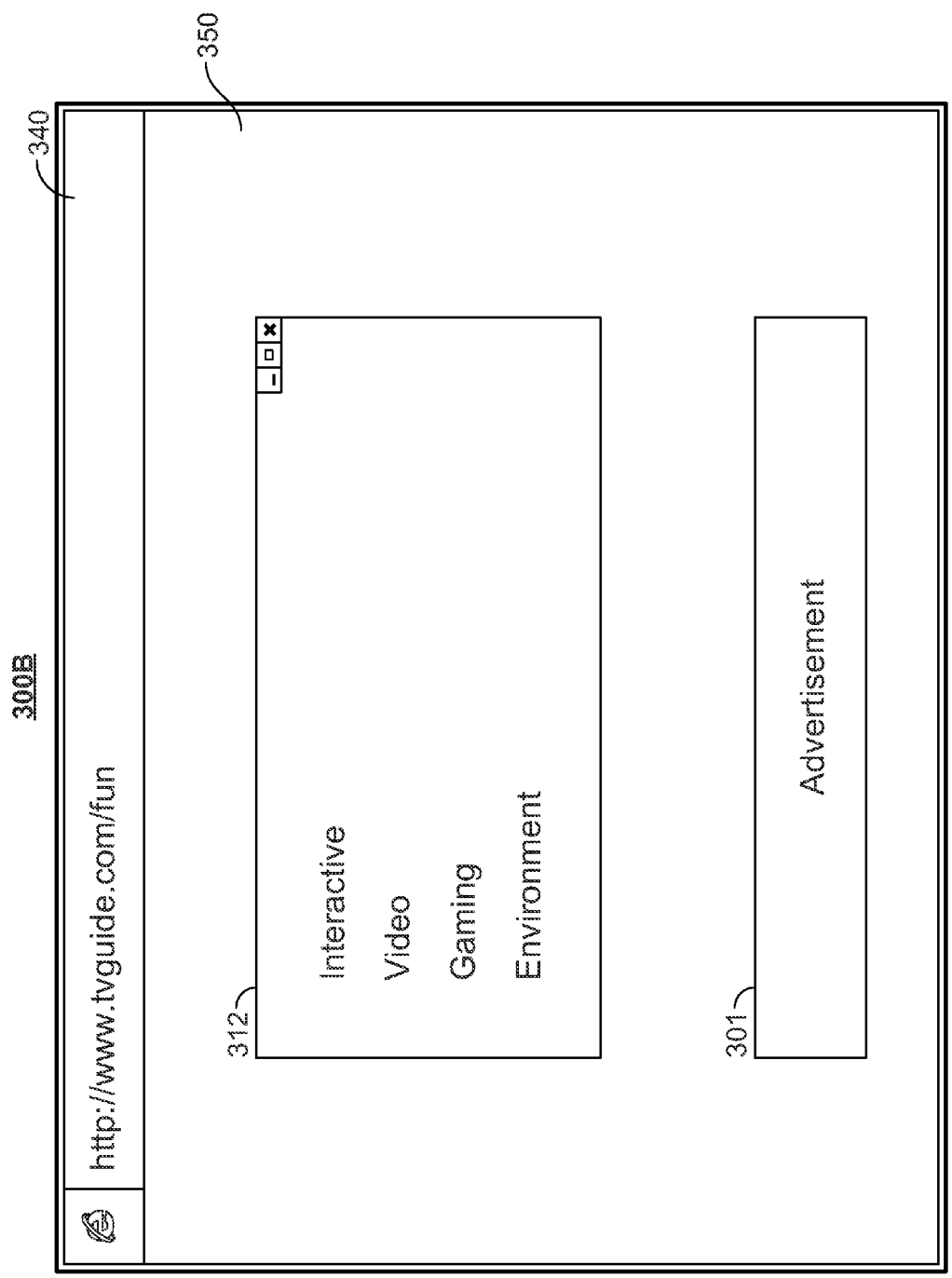
Figure 3C:
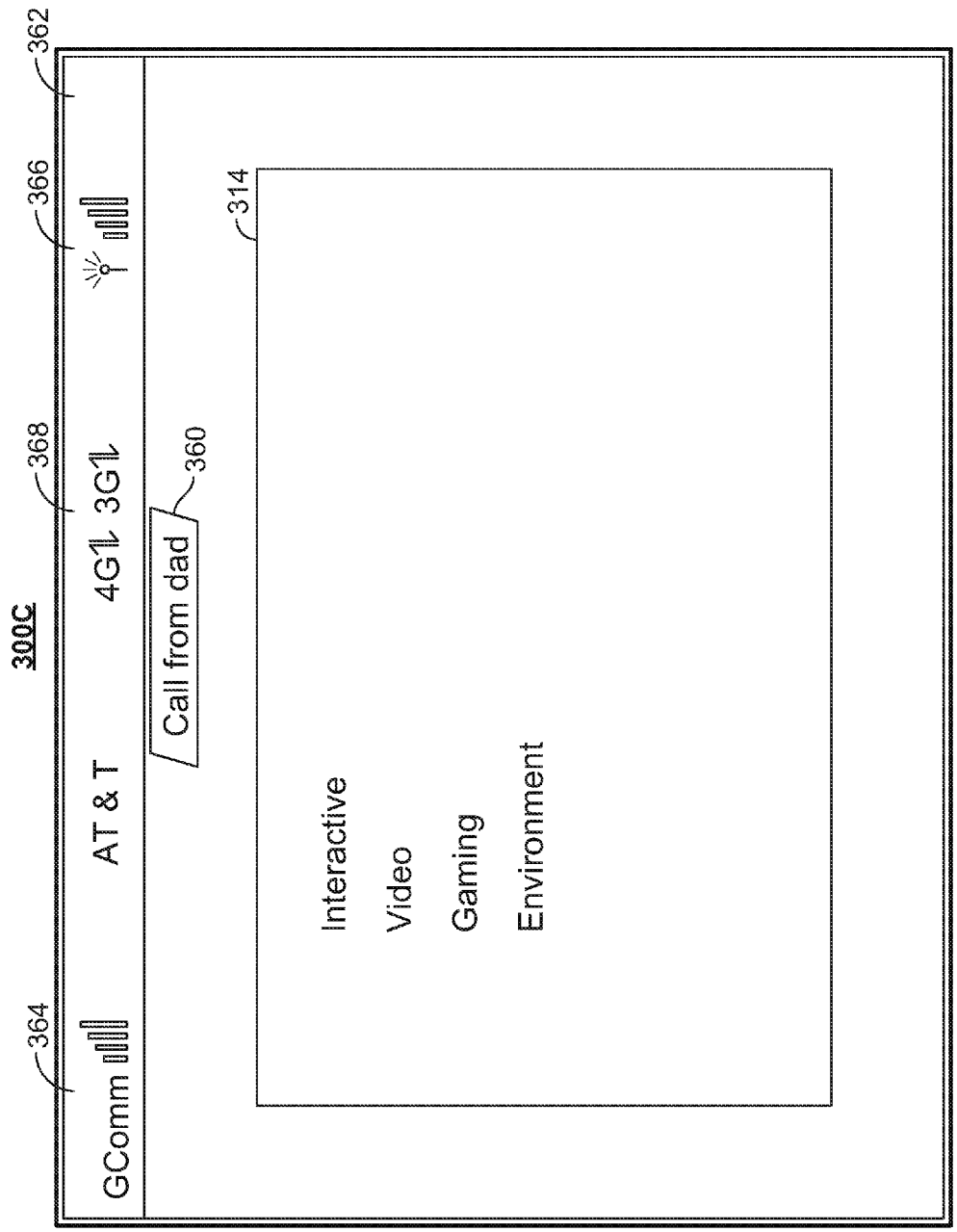

FIGS. 3A-C show illustrative display screens on various platforms that may be used to provide access to an interactive video gaming environment in accordance with an embodiment of the invention. In particular, FIG. 3A shows an illustrative display screen 300A of an interactive video gaming environment running on user equipment device 200. Display screen 300A may be provided by display 212 and may include a video (e.g., a television program or media asset) in a main portion 330 of the display, a browse overlay 320 and a widget display 310 that provides access to the interactive video gaming environment. Widget display 310 may include any of the screens of the interactive video gaming environment that the widget may generate such as the screens shown and described in connection with FIGS. 4 and 5.

User equipment device 200 may be a television equipment device that includes a tuner or network communications interface to access media assets (e.g., television programs or videos of programming). The tuner may be instructed by a user to tune to particular channels and display, as the video display on main portion 330, the video on the given channel. The channel may be a website or portal to a server on the Internet or other network that transmits media content. In such circumstances, the website or server may transmit the content at scheduled time intervals so that a user knows what content to expect and at what time. Network communications interface may allow the user or player to browse the Internet and download or stream, as video on main portion 330, a media asset from a website on the Internet. In particular, video 330 may be any media asset such as a television program, a video asset, audio asset, multimedia asset, pay-per-view media asset, on-demand media asset, streaming media asset, website, page of an e-book, or any other content suitable for display on display 212 of the user equipment device 200.

Processing circuitry 206 may receive a user request to browse for other media assets (e.g., program listings) and in response may retrieve from storage 208 a media asset that is currently available or will be available in the future. Processing circuitry 206 may display overlay 320 simultaneously with video on main portion 330 to allow the user to see the media assets that are currently available and that will become available in the future. For example, overlay 320 may include a time bar 324 that informs the user about when a given media asset is available and from what source (e.g., when the program is scheduled for broadcast on a given channel such as a television channel or station). Overlay 320 may also include a title 322 and any other information that uniquely identifies the media asset. Processing circuitry 206 may receive a user or player selection to view detailed information about the media asset in overlay 320, schedule a reminder or a recording for the media asset in overlay 320 or tune to or access the media asset in overlay 320. The media asset displayed in overlay 320 may be the same as the media asset displayed in video 330 or may be different. In particular, overlay 320 may provide information about the currently viewed media asset shown as video in main portion 330 or about a media asset available through another source and/or at a different time.

In some embodiments, widget display 310 may be displayed simultaneously with video on main portion 330 and overlay 320. Widget display 310 may occupy a larger portion of the screen than video 330, a smaller portion, or an equal portion as video 330. Processing circuitry 206 may receive a user or player input to interchange video 330 with widget display 310. In response to the user or player input, processing circuitry 206 may display widget 310 in the position where video on main portion 330 was on the screen and video 330 in the position on the screen where widget 310 was displayed.

In some implementations, widget display 310 may be displayed in full screen view when processing circuitry 206 receives a user command to display the interactive video gaming environment on the full screen of the user television equipment. For example, widget display 310 may be displayed in full screen view when the user highlights the region of widget display 310 and presses a SELECT key or when the user or player, through the touch screen of user equipment device 200, touches the region of widget display 310.

In some embodiments, the user or player may control the video displayed as video on main portion 330 on user equipment device 200 with a first user input interface 210 (e.g., a remote control or touch screen) and may interact with the interactive video gaming environment displayed in widget display 310 using a second user input interface 210 (e.g., a joystick, camera, mouse pad, voice command, gaming remote control, mobile phone, mobile device, touch screen, or other suitable interface). In some embodiments, the control of video on main portion 330 and widget display 310 may be performed using a single user input interface 210 (e.g., a remote control with a built-in camera 204 or a touch screen where the video is displayed).

In some embodiments, an advertisement may be received in the interactive video gaming environment through widget 105. In particular, OPP 113 may combine a video received from video asset server 114 with an advertisement received from advertisement server 122 using media processing server 118. The combined media asset may be provided to widget 105 for display to the player as a reward or penalty. In such circumstances or any other circumstance where widget 105 receives an advertisement from the interactive video gaming environment, widget 105 may display the received advertisement separately from the associated video.

For example, widget 105 may instruct processing circuitry 206 to display the advertisement in advertisement region 301 (which may or may not be part of overlay 320). Widget 105 may instruct processing circuitry 206 to display the media content associated with the advertisement (e.g., the video received from video asset server 114 and that is combined with an advertisement received from advertisement server 122) at the same time, after or before the advertisement in widget display 310. In particular, a media asset that includes a hint corresponding to a segment of the video game received from video asset server 114 may be displayed to provide the hint in widget display 310 and an advertisement (e.g., an image for a sponsor of the interactive video gaming environment) may be displayed inside of widget display 310 or in advertisement region 301 of the display.

FIG. 3B shows an illustrative display screen 300B of an interactive video gaming environment running on user computer equipment (e.g., personal computer, tablet computing device, iPad, laptop and/or mobile computing device). Display screen 300B may be provided by display 212 and may include main screen content 350 (e.g., web page of a website) in a main portion of the display, an address bar 340 and a widget display 312 (e.g., a pop-up display, or an overlay on top of main screen content 350) that provides access to the interactive video gaming environment. Widget display 312 may include any of the screens of the interactive video gaming environment that the widget may generate such as the screens shown and described in connection with FIGS. 4 and 5.

The user computer equipment may include a network communications interface to access media assets or Internet content (e.g., websites). Network communications interface may allow the user to browse the Internet and download or stream as main screen content 350 a media asset from a website on the Internet. In particular, main screen content 350 may be any media asset such as a television program, a video asset, audio asset, multimedia asset, pay-per-view media asset, on-demand media asset, streaming media asset, website, page of an e-book, or any other content suitable for display on a display screen of the user computer equipment.

Processing circuitry 206 may receive a user request to access a particular website through address bar 340 and in response may navigate the user to the website and display a web page as main screen content 350. In some implementations, the user may enter using user input interface 210, as the address in address bar 340, the Internet address (e.g., website URL or IP address) of the computer that hosts the interactive video gaming environment (e.g., OPP 113).

In some embodiments, widget display 312 may be displayed simultaneously with main screen content 350. Widget display 312 may occupy a larger portion of the screen than main screen content 350, a smaller portion, or an equal portion as main screen content 350. Processing circuitry 206 may receive a user input to interchange main screen content 350 with widget display 312. In response to the user input, processing circuitry 206 may display widget 312 in the position where main screen content 350 was on the screen and main screen content 350 in the position on the screen where widget 312 was displayed.

In some implementations, widget display 312 may be displayed in full screen view when processing circuitry 206 receives a user command to display the interactive video gaming environment on the full screen of the user computer equipment. In some implementations, display 300B provided on user computer equipment may have all of the same or similar functionality as display 300A provided on user equipment device 200 (e.g., a user television equipment).

FIG. 3C shows an illustrative display screen 300C of an interactive video gaming environment running on mobile phone equipment (e.g., iPhone, iPad, Droid, cellular telephone, mobile IP telephone, satellite telephone, etc.). Display screen 300C may be provided by display 212 and may include a widget display 314 that provides access to the interactive video gaming environment. Widget display 314 may include any of the screens of the interactive video gaming environment that the widget may generate such as the screens shown and described in connection with FIGS. 4 and 5. Mobile phone equipment may execute or run widget 105 to generate widget display 314 while continuing to run backend or foreground tasks necessary to operate a mobile telephone (e.g., communications with towers and handling, placing and receiving phone calls).

Screen 300C may include a status bar 362. Status bar 362 may include various indicators that inform the user about the status of the mobile phone equipment. In particular, status bar 362 may include a GComm network reception indicator 364, wireless data communications network reception indicator 368 and voice communications network reception indicator 366. Other indicators (not shown) may also be included in status bar 362 such as new message indicator (e.g., e-mail message, voicemail message, MMS message, or SMS message, etc.), WiFi reception indicator, battery power indicator, number of current applications running/suspended, or other suitable indicator. Mobile phone equipment may be equipped with a specialized communications interface (referred to as GComm—gaming communications) that is configured to handle data communications between only widget 104 and the interactive video gaming environment. GComm indicator 364 may indicate independently of the cellular communications indicators (e.g., 3G, 4G and voice communications) the reception of the GComm communications interface.

Processing circuitry 206 may process incoming phone calls and alert the user or player using prompt 360 about an incoming phone call. Prompt 360 may indicate who the call is being received from (e.g., by name, picture, video, audio, IP address or phone number or any combination thereof). Prompt 360 may be displayed as an overlay on top of widget display 314 so as to not interrupt the game play of the player in the interactive video gaming environment. The user or player may instruct processing circuitry 206 to ignore or accept the call. If the user instructs processing circuitry 206 to accept the call, processing circuitry 206 may suspend execution of widget 105 and minimize widget display 314 and allow the user to handle the call. If the user or player instructs processing circuitry 206 to ignore the call, processing circuitry 206 may route the call to voicemail and remove prompt 360 from the display.

An illustrative embodiment of the invention in the realm of a particular interactive video gaming environment is described below in connection with FIGS. 4 and 5. In particular, FIGS. 4 and 5 describe the invention in the realm of a "Key Game" interactive video game (which may be referred to as "the key game"). In this interactive video game, a player action transmitted to the remote server includes a request for a hint for a segment of the game, where each segment involves moves made by the player in the game to locate keys necessary to unlock a door to reach another level or segment. The remote server searches user submitted videos that include hints for where the keys are located in the current player segment of the video game. After identifying or locating a set of videos that include the hints that correspond to the current player segment, the remote server may select one of the videos and provide the video for the player. Although the invention is described in the context of the key game, the invention may be implemented in any other type of interactive video gaming environment (e.g., a racing video game, a sporting event video game such as a golf or a football game, a strategy-based video game, games regarding any hobby or interest such as bird watching or exotic dancing, an adventure role-playing game, etc.).

For example, in a racing video game, the segment in which the player requests the hint may be a particular design of a course map, movement of a car (e.g., making a car spin in place), or completion of a course map, and the user submitted videos with the hints may describe strategies for the design, driving or completion of a course map. Similarly, in a sporting event video game the segment in which the player requests the hint may be a particular team strategy created by the player during the course of the game; and in a game regarding a hobby such as bird watching, the segment in which the player requests the hint may be where to locate within, for example, a forest a particular kind of bird.

Figure 4:
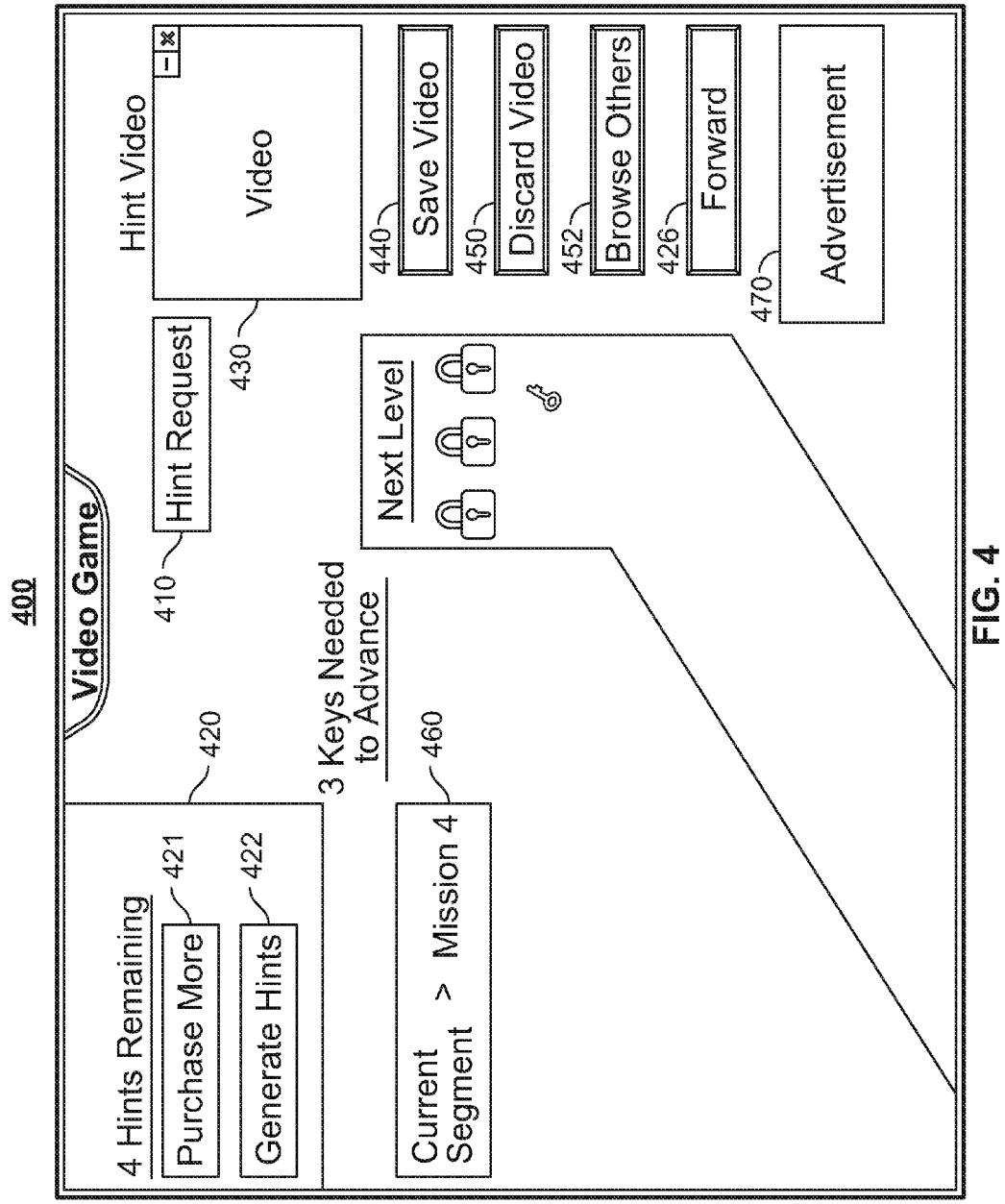
FIGS. 4 and 5 are illustrative interactive video gaming environment displays in accordance with embodiments of the invention.

FIG. 4 is an illustrative interactive video gaming environment display 400 in accordance with an embodiment of the invention. In particular, FIG. 4 is an illustrative display of a "Key Game" interactive video game. Display 400 may be a navigation screen presented to the user (or player) while playing a given segment within the interactive video gaming environment. This navigation screen may be referred to as the "current segment screen" of the interactive video gaming environment. The current segment screen may be a part of the interactive video game where the player is unable to complete the segment (e.g., the player did not find all of the keys) and needs a hint (e.g., the location of the key).

Display 400 includes a segment information region 460, a hint request option 410, a hint video region 430, and hints information region 420. Although each of the regions and options is shown in a single display 400, these regions may be broken up into one or more separate displays to accommodate different sized screens on different devices. For example, segment information region 460 may be displayed on one navigation screen of the interactive video game and an option to navigate to one of the other regions (e.g., the hint request option 410, hint video region 430, and hints information region 420, and/or an advertisement region) displayed on a separate screen may be provided with segment information region 460. Processing circuitry 206 may navigate the user to a screen corresponding to any one of the other options or regions based on the option selected by the user through a current navigation screen.

An advertisement 470 may be displayed in any navigation screen of the interactive video game. Advertisement 470 may be received from advertisement server 122. Advertisement 470 may inform the player or user about upcoming products and any available upgrades to the interactive video game. Advertisement 470 may be interactive. Processing circuitry 206 may receive a user selection of advertisement 470 and may in response allow the user or player to purchase the product being advertised. In some implementations, processing circuitry 206 may receive a user selection of advertisement 470 and may in response display additional information for the content or product being advertised or navigate the player or user to a website or navigation page corresponding to advertisement 470.

In some implementations, advertisement 470 may advertise or identify a program (e.g., a television show, future broadcast of a program, episode of a series of episodes of a program, etc.). In such circumstances, in response to receiving a user selection of advertisement 470, processing circuitry 206 may cause the identified program to be recorded or a reminder for the identified program to be scheduled. For example, processing circuitry 206 may instruct a recording device (e.g., storage 208) to record and/or store the program identified by advertisement 470. In particular, processing circuitry 206 may schedule a recording such that when the program identified by advertisement 470 is broadcast, storage 208 is used to record or store the program. Similarly, processing circuitry 206 may schedule a reminder such that when the program identified by advertisement 470 is broadcast, a message may be displayed for the player and/or otherwise provided to the player (e.g., 5 minutes before the broadcast of the program begins) informing the player of the upcoming broadcast.

An exit option (not shown) may be presented in any one of the navigation screens of the interactive video game. In response to receiving a user or player selection of the exit option, processing circuitry 206 may save any information or actions created by the player or user and shut down the interactive video game. In some implementations, processing circuitry 206 may transmit a communication to service provider 102 informing service provider 102 that the user or player is leaving the interactive video game. Service provider 102 may use this information to save any information associated with the user or player and prevent communication from any other user or player to the user or player that left. Service provider 102 may save any such communication requests for informing the user or player upon their return to the interactive video game.

In some embodiments, segment information region 460 may include any information that is associated with a current segment screen of the video game. For example, segment information region 460 may include the title of the video game, the current mission, the title of the current segment, the time within the segment or video game the player is in, the total elapsed time spent by the player in the segment and/or playing the video game, character(s) name(s), upcoming segment information, and/or any combination of the same. Segment information region 460 may inform the player about where the player currently is within the context of the video game. Segment information region 460 may be used by the player to identify a segment of the video game that corresponds to a given hint. The player may use the information in segment information region 460 to select which portion of a video game corresponds to a hint that the player creates or intends to create (discussed in more detail in connection with FIG. 5).

In some implementations, the player may place playmarks (or bookmarks) as the player progresses or regresses in the interactive video game. Playmarks may allow the player to return to the segment associated with the playmark without navigating or searching through the contents of the video game. For example, processing circuitry 206 may receive a player selection of region 460 and may in response automatically store a playmark that contains some or all of the information currently associated with or displayed in region 460. At a later point in time when the player desires to return to a playmarked segment (e.g., to be reminded of the context of the segment for creating a video that includes a hint), a list of previously stored playmarks may be presented to the player. Processing circuitry 206 may receive a player selection of one of the displayed playmarks and may in response navigate the player to a screen that recreates the segment of the video game associated with the playmark (e.g., based on the information stored with the playmark).

In some embodiments, hint request option 410 may be displayed to allow the player to request a media asset that includes a hint for the current segment of the video game the player is in. Hint request option 410 may be displayed continuously throughout the interactive video game or may be presented by processing circuitry 206 automatically when the player reaches a predetermined position within the segment of the interactive video game. In some implementations, hint request option 410 may be presented automatically when processing circuitry 206 determines that the player is unable to achieve an objective of the current segment of the video game (e.g., within a predetermined period of time or after a predetermined number of failed attempts).

In some implementations, processing circuitry 206 may receive a player selection of hint request option 410 and in response may generate a request to player action server 116. The request generated by processing circuitry 206 may indicate the need to player action server 116 for a media asset with a hint for the corresponding segment of the video game that caused the player to select option 410. To generate the request, processing circuitry 206 may create a game play data structure that includes information identifying a current segment of the game play within the interactive video gaming environment associated with the player. The game play data structure may include all or some of the information associated with segment information region 460. For example, the game play data structure may include at least one of the title of the video game, the current mission, the title of the current segment, the time within the segment or video game the player is in, the total elapsed time spent by the player in the segment and/or playing the video game, character(s) name(s), a unique identification code associated with the segment, upcoming segment information, and/or any combination of the same. In some implementations, the game play data structure may include information that uniquely identifies the player of the video game (e.g., a username and/or password).

In some implementations, instead of (or in addition to) waiting for the player to select hint request option 410, processing circuitry 206 may automatically retrieve a media asset with a hint for the current segment of the video game the player is in. This may effectively reduce latency for the player in case the player later chooses to manually access the hint. For example, as the player enters a portion of a segment of a video game (or after the player fails to complete a portion of a segment a predetermined number of times), processing circuitry 206 may transmit, to player action server 116, a request for a media asset with a hint for the segment of the video game the player is in. Processing circuitry 206 may receive a media asset with the requested hint from player action server 116 and locally store the received media asset. When the player selects an option to receive a hint for the segment already retrieved by processing circuitry 206, processing circuitry 206 may evaluate the authorization level of the player. If the player is authorized to receive a media asset with the hint, processing circuitry 206 may present the previously retrieved media asset with the hint and inform player action server 116 that the player has received and accessed the media asset with the hint. Player action server 116 may in response to receiving the information update a player profile to reduce a number of available requests for hints the player is authorized to make. Alternatively or in addition, processing circuitry 206 may locally track and reduce a number of available requests for hints the player is authorized to make.

In some embodiments, prior to transmitting the generated request, processing circuitry 206 may determine whether the player is authorized to request a media asset with a hint for the segment. In some implementations, the player may only be authorized to request a predetermined number of media assets with hints based on a package type of the video game the player is using (e.g., a free version or full paid version of the game), a level within the video game, a number of media assets with hints the player previously submitted, and/or any other suitable criteria. After the predetermined number of requests is reached, the player may be required to advance to a next level of the video game, purchase additional hints to be authorized to request hints and/or generate media asset hints for a previously completed segment to be entitled to request hints for future segments.

When the player is not authorized to request a media asset with a hint, processing circuitry 206 may display a prompt informing the player that the player is not authorized to receive a media asset with a hint. Processing circuitry 206 may include in the prompt options for the player to receive authorization to receive a media asset with a hint. For example, processing circuitry 206 may display purchase more option 421, purchase upgrade option (not shown) and/or generate hints option 422. In some embodiments, the authorization level of the player may be determined by player action server 116 after receiving the generated request. In response to receiving a user selection of purchase more option 421, processing circuitry 206 may present the player with a screen that allows the player to input payment information and select how many media asset hints the player would like to be entitled to receive (e.g., $5 for 10 hints, $10 for 100 hints, etc.). In response to receiving a user selection of generate hints option 422, processing circuitry 206 may navigate the player to screen 500 (FIG. 5) where the player may create media asset hints for submission to video asset server 114. In some implementations, the greater the number of hints the player creates and submits, the greater the number of hints the player may be entitled to receive from player action server 116.

Processing circuitry 206 may transmit the generated request including the game play data structure to player action server 116 for processing. In some implementations, the generation and transmission of this request is part of the player action in the interactive video gaming environment. Player action server 116 may apply information included in the received game play data structure to determine whether a media asset with a hint corresponding to the segment of the video game associated with the user exists or is available. For example, as described in more detail in connection with FIG. 5, video asset server 114 may store a plurality of media assets that include hints for segments of the interactive video game. Video asset server 114 may store multiple media assets for each segment where each media asset is received from a different user. For example, multiple media assets may all include a hint for a same segment of a video game but the media assets within the multiple media assets may differ from each by quality (e.g., image resolution, popularity, author, etc.). Player action server 116 may query a database associated with video asset server 114 to determine whether a media asset for the segment indicated by the received request is stored or available.

In response to determining that one or more media assets for the segment indicated by the received request are available, player action server 116 may select one of the media assets for transmission back to the requesting player. In some implementations, when multiple media assets that include hints correspond to the same segment, player action server 116 may select one of those multiple media assets in a random or pseudorandom manner. In some implementations, when multiple media assets that include hints correspond to the same segment, player action server 116 may select one of those multiple media assets based on an authorization level associated with the player. For example, player action server 116 may select a media asset of the multiple media assets that is associated with a low measure of quality when the player is associated with a first authorization level (e.g., the player is using a free version of the video game, has submitted less than a predetermined number of media asset hints, and/or has not reached a given level in the video game). Player action server 116 may select a media asset of the multiple media assets that is associated with a high measure of quality when the player is associated with a second authorization level (e.g., the player is using a paid version of the video game, has submitted more than a predetermined number of media asset hints, and/or has reached a given level in the video game). The measure of quality may include picture resolution, length of the videos, popularity of the media asset among a community of users, content quality of the media asset, originality of the media asset, rarity of the media asset, and/or any other suitable value that is attributed to the media asset that can be used to determine whether one media asset is "better" or more valuable than another media asset.

In some implementations, player action server 116 may retrieve a media asset with a hint having a greater measure of quality for higher levels in the interactive video game. For example, player action server 116 may retrieve a media asset with a hint with low image resolution (e.g., 320×240 pixel resolution for still images or 0.25 megabits per second for videos) when the player is indicated to be in the first few levels of the interactive video game. Alternatively, player action server 116 may retrieve a media asset with a hint with high image resolution (e.g., 1280×800 pixel resolution for still images or 1.25 megabits per second for videos) when the player is indicated to be in the last few levels of the interactive video game. In some implementations, player action server 116 may retrieve a media asset with a hint created by an unknown person (e.g., another user of the game) or that has poor or undesirable content when the player is indicated to be in the first few levels of the interactive video game. Alternatively, player action server 116 may retrieve a media asset with a hint created by a celebrity (e.g., Michael Jackson) or that has good or very desirable content when the player is indicated to be in the last few levels of the interactive video game. A similar selection of media assets with hints having particular measures of quality may be performed for any other type of measure of quality discussed above. Increasing the quality of media assets with hints at higher levels may encourage the player to try harder to reach higher levels to attain access to higher quality media assets.

In some implementations, player action server 116 may use information contained in the game play data structure (or stored user profile) that identifies the player who requested the hint to determine whether a selected media asset with a hint has previously been provided to the player. In particular, after player action server 116 selects a media asset with a hint for retrieval and provision to the player, player action server 116 may determine whether that retrieved media asset has previously been provided to the player. Player action server 116 may store with each media asset, an identifier of each player to whom the media asset with the hint has been provided. After selecting a media asset with a hint for provision to the player, player action server 116 may use the information that identifies the player to determine whether the selected media asset with the hint has previously been provided to the player. When player action server 116 determines that the media asset with the hint has previously been provided to the player, player action server 116 may select an alternate media asset associated with the same hint and having the same quality as the previously selected media asset. For example, player action server 116 may select a media asset associated with a hint and having a low measure of quality (e.g., having a 320×240 pixel resolution for still images or 0.25 megabits per second for videos) and determine that the media asset has previously been provided to the player. In response, player action server 116 may select an alternate media asset associated with the same hint and having the same measure of quality (e.g., having a 320×240 pixel resolution for still images or 0.25 megabits per second for videos) and provide the alternate media asset to the player instead.

In some embodiments, media processing server 118 may embed or associate an advertisement from advertisement server 122 into the selected media asset with the hint that is provided to the player in response to the request for the hint or the receipt of the player action. The advertisement may be a media asset that includes video, audio, images, or any combination thereof. For example, media processing server 118 may select a suitable advertisement from advertisement server 122 and combine the advertisement with the media asset having the hint. In particular, the advertisement may be combined with the media asset by being integrated as an overlay during some portion of the media asset having the hint (in the case where the media asset having the hint is a video). In some implementations, the advertisement may be combined with the media asset by being appended to the end, beginning, or some middle portion of the media asset so that when the player accessed the media asset, the player is exposed to the advertisement. In some implementations, the advertisement may be selected based on the content of the media asset and type of the media asset.

In some embodiments, media processing server 118 may determine what level of the interactive video game the player is in before selecting the advertisement for inclusion in the media asset. For example, media processing server 118 may determine that the player is in level 8 out of 10 in the interactive video game. Media processing server 118 may determine that no advertisements are provided to players in level 8. Accordingly, media processing server 118 may not incorporate the advertisement into the media asset and may transmit the media asset having the hint without the advertisement to the player for consumption (access or viewing).

In some embodiments, media processing server 118 may determine that the player has paid for access rights to avoid advertisements in the interactive video game. Media processing server 118 may determine that no advertisements are provided to players with such access rights. Accordingly, media processing server 118 may not incorporate the advertisement into the media asset that includes the hint and may transmit the media asset that includes the hint without the advertisement to the player for consumption (access or viewing). Media processing server 118 may provide the media asset that includes the hint and the advertisement or that does not contain the advertisement and only includes the hint to player action server 116. Player action server 116 may transmit the media asset that includes the hint corresponding to the current segment screen to the player at user equipment device 200.

In response to determining that a media asset for the segment indicated by the received request is not available, player action server 116 may generate a request for media assets associated with a segment corresponding to the segment identified by the player action. For example, player action server 116 may specify criteria for the type of media asset hint that is needed or that is missing from the repository of media assets in video asset server 114. Player action server 116 may publicize or make a list of requested media assets that include hints to the users of the interactive video game. Player action server 116 may receive submissions from users of the interactive video game of media assets that satisfy the criteria. Player action server 116 may evaluate the submitted media assets (e.g., manually and individually by a human operator at player action server 116). Player action server 116 may store a selected number of the received media assets with the hints in video asset server 114 and update a database of the media assets stored in video asset server 114. In particular, player action server 116 may update a database associated with video asset server 114 to indicate that one or more media assets that include hints are available for a given segment of the video game corresponding to the specified criteria (e.g., the segment for which previously there were no available media assets with hints).

After one or more media assets that include hints for the given segment of the video game corresponding to the specified criteria (e.g., the segment for which previously there were no available media assets with hints) are stored and made available, player action server 116 may generate an indication to the player which previously requested a hint for the given segment corresponding to the specified criteria. For example, player action server 116 may transmit a message to processing circuitry 206 with the indication.

Processing circuitry 206 may generate a prompt for the player identifying the availability of the media asset with the hint and allowing the player to view or access the available media asset. The message transmitted by player action server 116 may include a selected one of the available segments for provision or display to the player. As discussed below, a separate navigation screen may allow the player to browse all previously received media assets having hints. The newly received media asset having the hint may be added to the list of previously received media assets that the player may browse through.

In some implementations, when a media asset with a hint corresponding to the current segment screen is not available, there may be some delay between the time that the player action (e.g., a request for a hint associated with the current segment screen) in game play is received by the remote server and the time that the remote server receives and approves a previously unavailable media asset with the hint (e.g., ranging from a few days to several weeks). In such circumstances, player action server 116 may provide an indication to the player informing the player when the media asset is ready or may provide the player with an estimated time of when the media asset with the hint will be ready. For example, player action server 116 may transmit a text message or multimedia message to a mobile device associated with the player indicating the availability of the media asset with the hint. In some implementations, the message itself may contain the media asset with the hint. In some implementations, the message may provide a link for the player to select to access a website or page that contains the media asset with the hint.

In some implementations, the player may visit or access a navigation page that includes a video region (e.g., similar to region 430) to determine whether the media asset with the hint is ready. In some implementations, a navigation screen or current segment screen of the interactive video game may provide a visual indication informing the user that a newly available media asset with the hint is ready. The user may select the visual indication and processing circuitry 206 may navigate the user to a navigation page that includes the media asset or may automatically play back the media asset in region 430 of the current navigation screen of the game. In some implementations, processing circuitry 206 may continuously monitor the contents of a navigation page that includes region 430 to automatically determine whether a media asset with the hint is available and if so may inform the player.

In some embodiments, a hint video region 430 may be displayed in screen 400. Hint video region 430 may be displayed as an overlay (opaque or partially transparent) over a navigation screen of the interactive video game (e.g., a display screen of a segment of the interactive video game for which a hint was requested). A media asset that includes a hint corresponding to the displayed segment of the interactive video game may be presented in hint video region 430. Various playback options (not shown), such as play, pause, rewind, fast-forward, and/or stop, may be presented in or around hint video region 430 to allow the player to control playback of the media asset presented in hint video region 430. In some implementations, hint video region 430 may be interactive. In such circumstances, a media asset that includes a hint may be displayed in hint video region 430 and may provide a trivia question to the player. Processing circuitry 206 may receive a player selection of hint video region 430 and may allow the player to input a response to the trivia question. Processing circuitry 206 may display another media asset in 430 based on the player response. For example, processing circuitry 206 may display a reward type of media asset for correct player responses and a penalty media asset for incorrect player responses.

In some implementations, the media asset that includes the hint may be received with very small delay (e.g., less than 10 seconds) from player action server 116 after processing circuitry 206 receives the player selection of hint request 410 or may have been previously retrieved automatically by processing circuitry 206 so that no delay is incurred by the player when the player selects hint request 410. In either circumstance, hint video region 430 may automatically be presented on the current segment screen 400 when the player selects hint request option 410 and start playing back the retrieved media asset that includes the hint. In some embodiments, the player may select the media asset that includes the hint by browsing a plurality of media assets that include hints for various segments of a game from a different navigation screen. In such circumstances, in response to receiving a player selection of a given media asset that includes a hint, processing circuitry 206 may navigate the player to a screen of the interactive video game corresponding to the segment associated with the selected media asset. Processing circuitry 206 may display hint video region 430 and play back the selected media asset with the hint in the interactive video game screen to which the player was navigated.

In response to receiving a player selection of forward option 426, processing circuitry 206 may transmit the media asset with the hint (e.g., the media asset played back in region 430) to a player or user specified destination over communications network 130. The destination may be a user equipment device 200 associated with another user or player. For example, the player may specify the IP address, e-mail address or other unique information that identifies another user. Processing circuitry 206 may send the media asset that includes the hint to the user based on the information supplied by the player. Accordingly, players may share the media assets they receive with each other. In some implementations, media processing server 118 may add copyright protection information (or other copy or sharing protection) to the media asset before the media asset is provided to the player. In such circumstances, processing circuitry 206 may prevent the display of option 426 and/or prevent the transfer or transmission of the media asset displayed in region 430 to another user/player or device based on the copy protection. Similarly, in such circumstances, processing circuitry 206 may prevent the display of option 440 and/or prevent the media asset displayed in region 430 from being locally or remotely stored for later consumption.

In some embodiments, hints information region 420 may be displayed in screen 400. Hints information region 420 may be displayed as an overlay (opaque or partially transparent) over a navigation screen of the interactive video game (e.g., a display screen of a segment of the interactive video game for which a hint was requested). In some implementations, hints information region 420 may be displayed in response to processing circuitry 206 receiving a request (by selection of an on-screen option) to display hints information region 420. In some implementations, hints information region 420 may be displayed at predetermined time intervals (e.g., every 5 minutes).

Hints information region 420 may include information that indicates to the player hints status and other data pertaining to hint requests. For example, hints information region 420 may include an indication of when a new media asset with a hint is available for a segment in the video game for which the player previously requested a hint. In particular, when a media asset with a hint for a given segment in the video game is not available, player action server 116 may wait to receive and approve a predetermined number of media assets with the hint for the given segment before providing the media asset with the hint to the player. In such circumstances, when processing circuitry 206 receives indication from player action server 116 that a previously requested hint media asset is available, an indication may be displayed in region 420. The indication may include information that uniquely identifies the previously requested hint (e.g., a title of the video game, a time stamp associated with a segment, a title of the segment within the video game, the time and date when the request for the hint was received from the player etc.).

Hints information region 420 may include information that indicates to the player how many more requests for hints the player can make. For example, when the authorization level of the player allows the player to only request five hints for a given level in the video game, hints information region 420 may indicate that 5 hints remain. The number of available hints that remain may be reduced each time the player requests a hint media asset for a segment of the video game. In some embodiments, the number of hints the player may request may based on a package or upgrade or version of the video game being used by the player, a number of hint media assets the player created and submitted previously, a number of hints purchased by the player, and/or any other suitable factor. The player may select purchase more option 421 in order to increase the number of available hints the player can request (e.g., by paying for additional hints).

In some embodiments, player action server 116 or processing circuitry 206 may determine how many requests for media assets with hints the player is authorized to make based on a level of the player within the interactive video game or segment of the game. For example, a player that is in a higher level of the interactive video game may be authorized to make a greater number of requests for media assets with hints in a given period than a lower level of the same game.

Player action server 116 or processing circuitry 206 may determine whether the player has made the maximum number of requests before allowing the player to make another request for a media asset with hints. In some implementations, the player may select generate hints option 422 to create and submit a media asset with a hint for any previously completed segments of the video game or future segments of the video game. After the player creates and submits a predetermined number of media assets with hints, processing circuitry 206 or player action server 116 may increase the number of available hints the player may request. In response to receiving a player selection of generate hints option 422, processing circuitry may navigate the player to navigation screen 500 (FIG. 5). In some implementations, there may be a one-to-one correspondence between the number of media assets with hints the player creates and submits and the number of requests for hints the player may make. Alternatively, the player may be required to create and submit ten media assets with hints before being authorized to request a single request for a media asset with a hint.

Referring back to FIG. 4, the player may browse previously received and stored media assets that include hints by selecting browse option 452. In response to receiving a player selection of browse option 452, processing circuitry 206 may navigate the user to a separate navigation region of the interactive video game (not shown) that includes options for the player to browse previously submitted requests or player actions that resulted in media assets with hints being provided to the player. Such a navigation screen may allow the player to be reminded about what action the player submitted that resulted in the media asset that includes the hint. More specifically, the player may be reminded about what segment of the game a request or player action was made to cause a media asset with a hint for that segment to be retrieved. In particular, such a screen may be valuable because the amount of delay between submitting an action during game play and receiving a media asset that includes a hint for that segment may be on the order of days or weeks. Processing circuitry 206 may receive a player input and in response retrieve from local or remote storage a screen (e.g., an image of current segment screen) representative of the action that was submitted by the player that resulted in the media asset that includes the hint. In some implementations, processing circuitry 206 may generate a short segment or clip (e.g., 10 seconds out of a 1 minute action) of the previously submitted action instead of displaying an image of the screen corresponding to the segment associated with the action.

Processing circuitry 206 may display an option to sort, organize and/or categorize the displayed media assets in the navigation screen where the player browses through previously received media assets that include hints. For example, processing circuitry 206 may display an option for the player to instruct processing circuitry 206 to only display media assets that include content of a certain type (e.g., drama, action, comedy, etc.) and/or that are of a certain media type (e.g., video media assets, audio media assets, graphics, website, etc.) and/or that are of a certain quality (e.g., above a certain image resolution or created by a particular source (e.g., a celebrity or user)) and/or that pertain to one or more segments of the interactive video game. In some embodiments, processing circuitry 206 may organize the previously received media assets with hints in the navigation screen based on any suitable criteria. For example, processing circuitry 206 may sort the media assets in an order based on creation date, access date, popularity, size, quality, an alphabetical order of titles, or any other suitable criteria. For example, processing circuitry 206 may display the listings of the previously received and/or stored media assets with hints in sequence from lowest quality to highest quality media asset, or the other way around.

Visual identifiers of each media asset that includes a hint may be displayed in the browse media assets screen. Identifiers may include program listings, titles of the respective media assets, an image associated with the media asset or any other unique identifier associated with the media asset that identifies the media asset to the player. In some implementations, the identifier may be a picture or image of (or associated with) the user that created or submitted the media asset with the hint.

Processing circuitry 206 may receive a player selection of any one of the displayed identifiers and may in response retrieve the corresponding media asset with the hint from local or remote storage. Processing circuitry 206 may play back and display the retrieved media asset in region 430. Alternatively, processing circuitry 206 may play back and display the retrieved media asset in a separate navigation screen.

In response to receiving a player selection of discard option 450, processing circuitry 206 may delete the media asset displayed in region 430 from local storage or from a remote storage location available to the player. A confirmation prompt may be presented before the media asset is discarded to prevent accidental selection of option 450 and thereby removal of the media asset with the hint. The player may be required to provide further user input confirming the desire to delete the media asset presented in region 430 before processing circuitry 206 deletes the media asset.

In some embodiments, users may generate or create media assets (e.g., videos) with hints to be provided to a player by selecting generate hints option 422. In particular, in addition to receiving media assets with hints created by users, a player may also create media assets with a hint for provisions to another player. Processing circuitry 206 may navigate the user to a hint video generation screen 500 (FIG. 5) in response to receiving a user selection of option 422.

Figure 5:
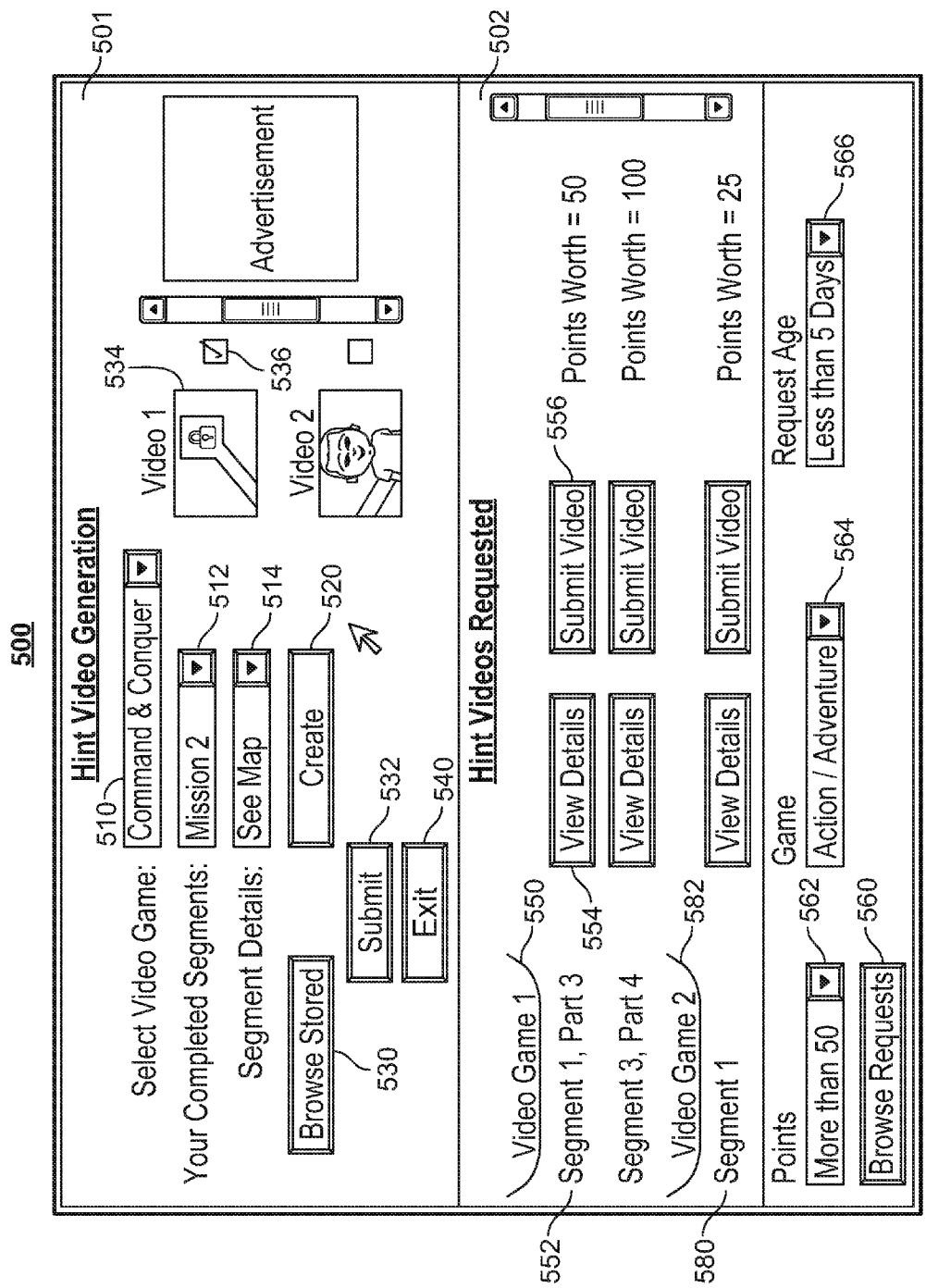

FIG. 5 is an illustrative interactive video gaming environment display in accordance with an embodiment of the invention. FIG. 5 includes video hints screen 500 which the user may use to create and transmit to video asset server 114 media assets with hints. Video hints screen 500 may include a media asset creation region 501 and a media asset hint request region 502. Although each of the regions is shown in a single display 500, these regions may be broken up into one or more separate displays to accommodate different-sized screens on different devices.

Media asset creation region 501 may allow the user to generate and submit a new media asset that includes a hint for the interactive video game. For example, the user may generate (or create) a media asset (video, graphic, image, or audio) of the user explaining how to complete (or giving a clue as to how to complete) a task within a segment of a particular interactive video game. The media asset with the hint may be of any unlimited length and size but, in some implementations, may be limited by the interactive video gaming environment to a predetermined length or size (e.g., less than 5 minutes long or less than 5 megabytes). In some implementations, the length or size of the media asset with the hint may be limited based on the type of media (e.g., less than 5 minutes for a video media asset and less than 10 minutes for an audio media asset).

In some embodiments, in order to create a media asset with a hint, the user may select between various options to identify the segment of the video game with which to associate the media asset. For example, a game menu option 510 may be used or selected by the user to choose from among a plurality of different video games. In some implementations, any video game not listed within menu option 510, may be manually added to the list by the user by inputting criteria that uniquely identifies the video game (e.g., a serial number, a title, a description, etc.). After processing circuitry 206 receives a user selection of a game from menu option 510, processing circuitry 206 may list segments of the game in segment selection menu 512. In some implementations, processing circuitry 206 may determine which segments of the selected game the user previously completed (or is in progress of completing) and limit the segments listed in menu 512 to only those determined segments. This way, the user may only be allowed to create a media asset with a hint for portions or segments of the interactive video game which the user has completed or is knowledgeable of.

In some embodiments, after the user specifies the name of the game and the segment for which the user would like to create a media asset hint, processing circuitry 206 may display information associated with the selected segment. The information displayed may include any of the information displayed in region 460 (FIG. 4). A segment details menu 514 may be displayed to allow the user to select which information the user would like to see about the segment. For example, segment details menu 514 may include a map options. In response to processing circuitry 206 receiving a user selection of the map option, processing circuitry 206 may display (as an overlay prompt or separate navigation screen) a map or segment screen associated with the segment selected in menu 512. For example, the map may correspond to current segment screen 400 and may be used to remind the user about the contents and context of the selected segment to ease the creation of the media asset hint. The displayed map may be interactive to allow the user to navigate through the segment of the game to ease the explanation of the hint. In some embodiments, the map may be incorporated (e.g., as an overlay) into the media asset created by the user to allow the player to better understand the hint.

In some embodiments, the fields of option 510, menu 512 and menu 514 may be automatically populated to correspond to the last segment the player was in. For example, when the player selects generate hints option 422 (FIG. 4), processing circuitry 206 may navigate the player to screen 500 to allow the player to create a media asset hint for the current segment the player is in. Accordingly, each of the fields of option 510, menu 512 and menu 514 may be automatically populated by processing circuitry 206 to correspond to the current segment (e.g., of screen 400) the player was in when processing circuitry 206 received the selection of generate hints option 422.

In some embodiments, processing circuitry 206 may receive a user selection of create option 520. In response to receiving the user selection, processing circuitry 206 may navigate the user to a display that allows the user to create a media asset with a hint. In particular, processing circuitry 206 may present options for the user asking the user what type of media asset hint the user would like to create. For example, processing circuitry 206 may present the user with options to create a video, audio, graphic, or any combination thereof. Based on the user selection of the option, processing circuitry 206 may activate the appropriate or necessary input circuitry (e.g., camera 204, user input interface 210, microphone, etc.). Processing circuitry 206 may use the video game information provided in fields option 510, menu 512 and menu 514 to generate a game play data structure for the created media asset (e.g., processing circuitry 206 may associate the video game information of fields option 510, menu 512 and menu 514 with the created media asset hint). Processing circuitry 206 may record (store) the media asset hint created by the user along with the associated video game information upon receipt of a user indication that the creation of the media asset hint is complete. In some implementations, processing circuitry 206 may present an option for the user asking whether the user would like to incorporate or associate any segment details of menu 514 (e.g., a map) into the created media asset. This may allow a player who receives the media asset hint to view the same map the user is describing in providing the hint.

In some implementations, processing circuitry 206 may store the media asset hint locally in storage 208 of user equipment device 200. In some implementations, processing circuitry 206 may upload and transmit the created media asset hint, along with the game play data structure (e.g., game information), to video asset server 114 for storage remote from user equipment device 200 in response to receiving a user selection of submit option 532. Video asset server 114 may store the game play data structure or game information with the received media asset hint that identifies the user or user equipment device 200 associated with the stored media asset hint. In some implementations, each user may be allocated a predetermined amount of storage space on video asset server 114 which may be used for storing media asset hints and/or any other information pertaining to the interactive video game.

In some embodiments, processing circuitry 206 may retrieve media assets with hints that the user previously created or stored. In some implementations, each previously created media asset hint may be listed using an image or unique identifier associated with the previously created media asset hint. For example, when the previously generated media asset hint is a video, a random frame of the video (or a frame selected by the user) may be shown within media asset creation region 501. In some implementations, the previously generated media asset hint may be a graphic or an image, and in these circumstances, a thumbnail of the previously generated graphic or image may be depicted on the display within media asset creation region 501. In some implementations, the previously generated media asset hint may be an audio segment, and in these circumstances, audio playback options with a title of the previously generated media asset hint may be shown within media asset creation region 501. For example, media asset hint listings 534 may be displayed each corresponding to a different media asset hint and being represented by the graphic or image associated with the media asset hint.

In some embodiments, the user may select, click on, or highlight an area corresponding to where a listing of the media asset hint is displayed in region 501. In response to receiving the user input (selecting, clicking on, or highlighting), processing circuitry 206 may play back the media asset hint where the corresponding listing of the media asset hint is shown.

The listings of media assets with hints displayed in media asset creation region 501 may correspond to any locally or remotely stored media asset hint created by the user. In some implementations, processing circuitry 206 may receive a selection of a browse/search stored option 530. Browse/search stored option 530 may be selected by the user when the user does not see a listing for a media asset hint which was previously created by the user. For example, the user may have created a media asset hint on a different user equipment device 200 on another occasion which may not have been synchronized with the information about the previously generated media asset hints stored on user equipment device 200 currently being used by the user. For example, the user may be accessing the interactive video game using a portable device and the listings of the media assets may be those that are known to the portable device. The user may have generated a media asset hint using a television equipment device which may not have been transferred into storage of the portable device. Accordingly, in response to receiving the user selection of browse/search stored option 530, processing circuitry 206 may display a menu through which the user may locate media asset hints stored in other devices or locations (e.g., the television equipment device or a portable storage device such as a USB key). Processing circuitry 206 may add a listing for the media asset hint retrieved from the browsed location (e.g., the portable storage device) for the user to select for inclusion in the game.

Media asset creation region 501 may include a selection element 536 (e.g., a checkbox) next to or associated with each displayed media asset hint listing. Processing circuitry 206 may receive input from the user selecting one or more media asset hints using each corresponding selection element 536. The media asset hints corresponding to the listings which are selected by the user using, for example, selection element 536 may be submitted to video asset server 114 and evaluated for provision to a player of the interactive video gaming environment as a media asset with a hint for a requested segment. In particular, processing circuitry 206 may receive a user selection of submit selected option 532 and in response submit the selected media asset hints to video asset server 114. Processing circuitry 206 may include with the submission to video asset server 114 an indication of which segment of the video game the media asset the media asset hints are associated based on fields in option 510, menu 512 and/or menu 514.

In some embodiments, an editor, host, system administrator or curator (e.g., a human managing operations of the video game) may access or log into video asset server 114 to monitor some or all of the media asset hints submitted to video asset server 114. In some implementations, some or all of the media assets hints submitted to video asset server 114 may not be provided to players as media asset hints until the editor, host, system administrator or curator approves the submitted media asset. In particular, the editor, host, system administrator or curator may view media asset hints pending approval to determine whether the content is too explicit or exceeds a rating that players are willing to tolerate or that is associated with the video game. When the editor, host, system administrator or curator determines the media asset exceeds a rating or is too explicit, the editor, host, system administrator or curator may reject or not approve the submitted media asset and inform the user who submitted the rejected media asset. In some implementations, users may be blocked from submitting media asset hints if they submit more than a predetermined number of media asset hints that get rejected, for example because of being too explicit.

In some embodiments, video asset server 114 may determine whether the user is authorized to submit the media asset hint to the interactive video game before storing the media asset hint on video asset server 114. In some implementations, video asset server 114 may determine that the user is authorized based on a level of the user within the interactive video game. For example, a user that is in a higher level of the interactive video game may be authorized to submit a greater number of media asset hints in a given period than a lower level of the same game.

In some embodiments, a user may browse requests generated by player action server 116 for submission of media assets with hints for a given segment of a video game that are not available on video asset server 114. In particular, the user may navigate to media asset hint request region 502 to search and browse through requests for media asset hints generated by player action server 116. Media asset hint request region 602 may display separately media asset hint request listings for requests associated with different games. For example, a media asset hint request listing 552 may be displayed on a top portion 550 with an indication that media asset hint request listing 552 corresponds to video game 1. Similarly, media asset hint request listing 580 may be displayed on a bottom portion 582 with an indication that media asset hint request listing 580 corresponds to video game 2. Each displayed media asset hint request listing may include an identifier (e.g., titles of the respective video game, titles of the segment of the video game, any information included in the game data structure player action server 116 receives from processing circuitry 206, an image associated with the media asset hint request or any other unique identifier associated with the media asset hint request that identifies segment of the video game for which a media asset hint is requested or needed).

Each displayed media asset hint request listing may be associated with a different number of points. The points may be used to allow a user to accumulate a certain number and to be entitled to awards (e.g., free or discounted video game upgrades, additional hint requests that the player can make in playing a video game, memorabilia, etc.). Users may be ranked relative to one another based on the total number of points accumulated. The user may be entitled to receive the specified number of points when the user creates and submits a media asset hint for the requested segment and after the requested media asset hint is approved by player action server 116. A media asset hint that is created and submitted by a user and that is not approved by player action server 116 may prevent the user from receiving the specified number of points. In some embodiments, a user that submits a media asset hint for a particular segment that is requested may be penalized (e.g., have the total number of points reduced) by the number of points specified (or a fraction thereof) if player action server 116 ultimately rejects the submission.

A view details option 554 may be displayed for each media asset hint request listing. Processing circuitry 206 may receive a user selection of view details option 554. In response to receiving the user selection of option 554, processing circuitry 206 may retrieve from local storage or from player action server 116 game information associated with the media asset hint request listing corresponding to the selected option. For example, processing circuitry 206 may retrieve any information stored in a game data structure (e.g., information presented in segment information region 460) associated with the segment of the video game corresponding to the media asset hint request listing associated with selected option 552. The details corresponding to option 554 may be displayed as an overlay (opaque or partially translucent) in a prompt over screen 500 or in a separate navigation screen of the video game.

A submit video option 556 may be displayed for each media asset hint request listing. Processing circuitry 206 may receive a user selection of submit video option 556. In response to receiving the user selection of option 556, processing circuitry 206 may allow the user to create and submit a media asset to player action server 116 in a similar manner as discussed above and below in connection with option 520. Processing circuitry 206 may automatically associate game information with the created media asset hint based on information associated with media asset hint request listing 552 (e.g., information retrieved when option 554 is selected). Processing circuitry 206 may transmit the created media asset hint and the automatically associated information to player action server 116 for evaluation and acceptance.

In some implementations, media asset hint requests for different games may be mixed together and displayed as one region in region 502. In such circumstances, processing circuitry 206 may display one or more options 562, 564, and 566 to sort, organize and/or categorize the displayed media asset hint requests. For example, processing circuitry 206 may display an option (not shown) for the user to instruct processing circuitry 206 to only display media asset hint requests corresponding to one or more games in region 502. Processing circuitry 206 may display option 562 for the user to instruct processing circuitry 206 to only display media asset requests that are associated with a certain number of points (e.g., media asset requests that are associated with more than 50 points). Processing circuitry 206 may display option 564 for the user to instruct processing circuitry 206 to only display media asset hint requests that correspond to interactive video games of one or more types (e.g., action, adventure, role play, racing, etc.). Processing circuitry 206 may display option 566 for the user to instruct processing circuitry 206 to only display media asset requests that are of a certain age (e.g., media asset requests that were generated and/or received by player action server 116 from a player less than a certain number of days/weeks/months ago). In response to receiving a user selection of browse requests option 560, processing circuitry 206 may retrieve media asset request listings from player action server 116 matching the criteria specified by the user with options 562, 564 and/or 566 for display in region 502.

In some embodiments, processing circuitry 206 may organize the media asset hint requests displayed in region 502 based on any suitable criteria. For example, processing circuitry 206 may sort the displayed media asset hint requests in an order based on creation date, access date, popularity, quality, popularity among users of the interactive video game, an alphabetical order of titles, or any other suitable criteria.

In some embodiments, processing circuitry 206 may monitor player actions within a segment of an interactive video game (e.g., a golf game or other sporting event game). Processing circuitry 206 may determine whether a given action violates rules of the segment of the interactive video game. For example, processing circuitry 206 may determine whether in a given situation or segment of the golf game (e.g., when the ball is stuck in the sand), the player has hit the golf ball in a way or used a putter that violates rules of the golf game. In response to determining that the player action violated a rule of the interactive gaming application, processing circuitry 206 may automatically retrieve a media asset hint from player action server 116 and display the retrieved media asset hint in region 430. The media asset hint that is retrieved may include an explanation of the rules of the segment that pertain to the violation of the rule (e.g., the media asset may be an instructional video explaining the rules applicable to a given situation or segment that was violated by the player). For example, the media asset hint may provide an explanation of what putters are allowed and how the golf ball can be hit in the situation or segment of the video game that the player action violated the rule.

In some embodiments, the interactive video gaming environment may be a three-dimensional (3D) interactive video gaming environment. For example, the interactive video gaming environment may be a stereoscopic interactive video gaming environment. Stereoscopic interactive video gaming environment may require the user to wear a stereoscopic optical device (e.g., 3D glasses) to view media asset hints in 3D. Any portion of the interactive video gaming environment discussed above may be viewed or accessed in 3D. For example, player actions may be created, accessed or generated in 3D using 3D-enabled camera equipment on user equipment device 200 and/or a 3D-enabled display. Media assets with hints may be created, accessed and/or generated in 3D using 3D-enabled camera equipment on user equipment device 200 and/or a 3D enabled display. Any one of the navigation screens discussed above may be accessed and/or generated in 3D using user equipment device 200 and/or a 3D-enabled display. Although the discussion above is provided in the context of a stereoscopic environment requiring 3D optical devices, these teachings are equally applicable to environments and systems that generate 3D environments without requiring 3D optical devices (e.g., without requiring 3D glasses to be worn).

Figure 6:
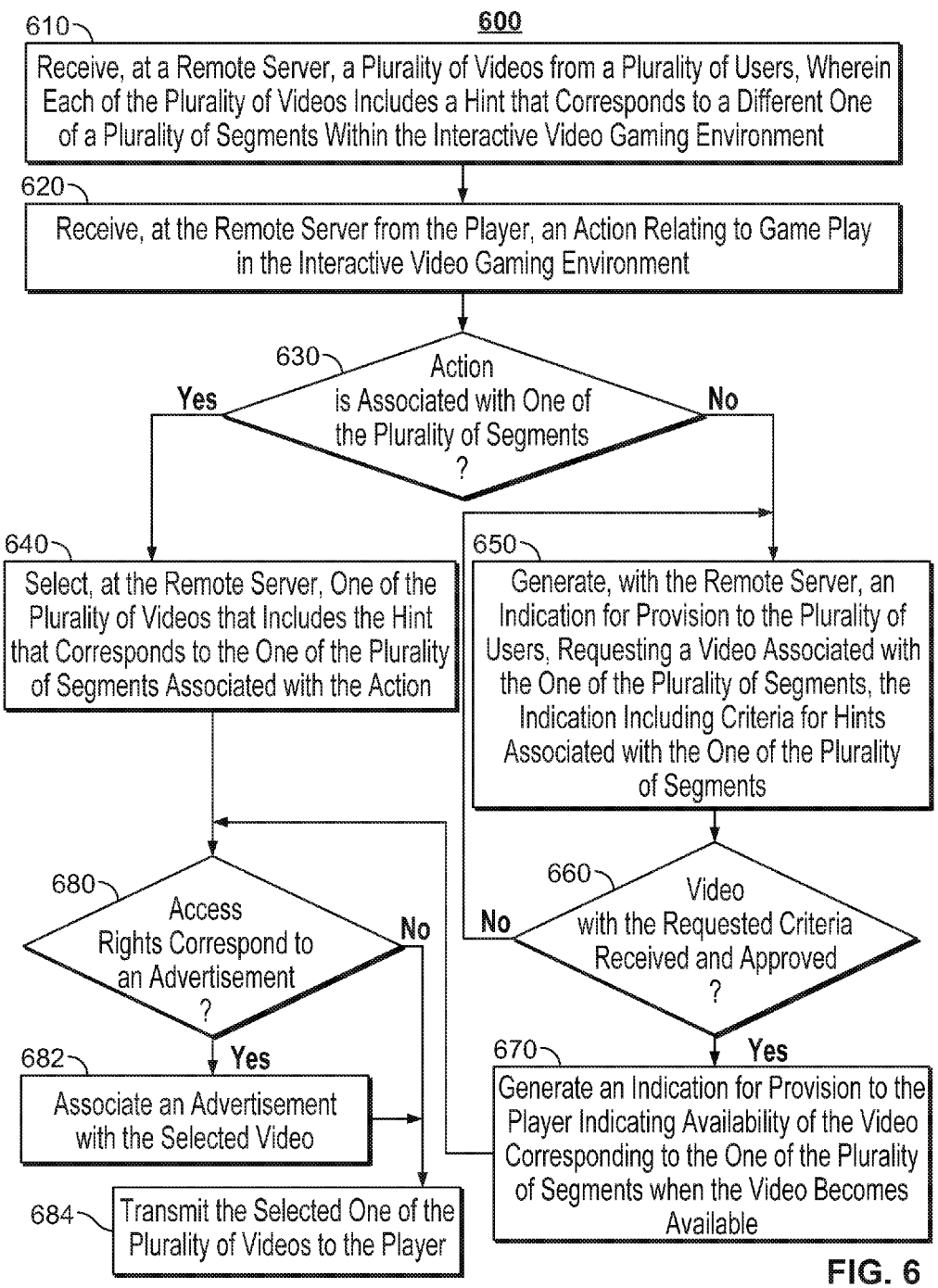
FIGS. 6 and 7 are illustrative flow diagrams of the interactive video gaming environment in accordance with embodiments of the present invention.

FIG. 6 is an illustrative flow diagram 600 of an interactive video gaming environment in accordance with an embodiment of the present invention. At step 610, a plurality of videos is received at a remote server from a plurality of users. Each of the plurality of videos includes a hint that corresponds to a different one of a plurality of segments within the interactive video gaming environment. For example, video asset server 114 may receive and store from a plurality of users media assets that include hints that the users create (FIG. 1). The users may generate or create the media asset hints using media asset creation region 501 (FIG. 5).

At step 620, an action is received from a player relating to game play in the interactive video gaming environment. For example, player action server 116 may receive and store from a player an action (e.g., a request for a hint media asset corresponding to a current segment of the video game) that the player makes (FIG. 1). The player may generate the action by selecting hint request option 410 (FIG. 4).

At step 630, a determination is made as to whether the action is associated with one of the plurality of segments. When the action is determined to correspond to one of the plurality of segments, the process proceeds to step 640, otherwise the process proceeds to step 650. For example, player action server 116 may determine whether the current segment information associated with the received player action corresponds to any segments associated with the stored plurality of media assets.

At step 640, one of the plurality of videos that includes the hint that corresponds to the one of the plurality of segments associated with the action is selected at the remote server. For example, player action server 116 may select one of the media asset hints corresponding to the segment of the video game requested by the player for provision to the player by looking up in a database the media assets that are associated with the requested segment.

At step 650, an indication for provision to the plurality of users is generated with the remote server. The indication requests a video associated with the one of the plurality of segments and includes criteria for hints associated with the one of the plurality of segments. For example, player action server 116 may generate at least one media asset hint request listing 552 (FIG. 5) when player action server 116 determines a need for a media asset with a hint for the requested segment (e.g., when no media asset hint is available for the segment of the video game for which the hint is requested).

At step 660, a determination is made as to whether a video with the requested criteria is received an approved. When the video with the requested criteria is received and approved by remote server, the process proceeds to step 670, otherwise the process proceeds to step 650. For example, player action server 116 may receive a user created media asset when the user submits a media asset with a hint corresponding to media asset hint request listing 552 by selecting option 556. Player action server 116 may evaluate the received media asset hint to determine whether all the criteria is met and if all the criteria is met by the received media asset hint, player action server 116 may approve the received media asset hint.

At step 670, an indication for provision to the player is generated indicating availability of the video corresponding to the one of the plurality of segments when the video becomes available. For example, processing circuitry 206 may display in region 420 an indication that a previously requested media asset hint is newly or now available for the player to view and/or access. The indication may be received by processing circuitry 206 from player action server 116 after player action server 116 approves a predetermined number of media asset hints for the requested segment of the video game.

At step 680, a determination is made as to whether access rights (of the player or user) correspond to an advertisement. When the access rights are determined to correspond to an advertisement, the process proceeds to step 682, otherwise the process proceeds to step 684. For example, player action server 116 may determine whether the authorization level associated with a player who submitted the player action (request for a media asset hint) corresponds to an advertisement (e.g., whether the player is using a certain type of package (free or paid) of the video game or whether the request for a media asset hint exceeds a predetermined total number of hints the player is entitled to make).

At step 682, an advertisement is associated with the selected video for display with the video. For example, media processing server 118 may select an advertisement from advertisement server 122 and associate the selected advertisement with the selected media asset. Media processing server 118 may embed the selected advertisement within the media asset hint so that the advertisement appears as an overlay or before, after or during presentation of the media asset hint to the player. Media processing server 118 may alternatively link the advertisement with the media asset hint such that processing circuitry 206 displays the advertisement separately from the media asset hint on a display.

At step 684, the selected one of the plurality of videos is transmitted or made available to the player. For example, the player may navigate to region 430 to playback or access the media asset hint received from player action server 116 based on the action the player submitted to player action server 116.

Figure 7:
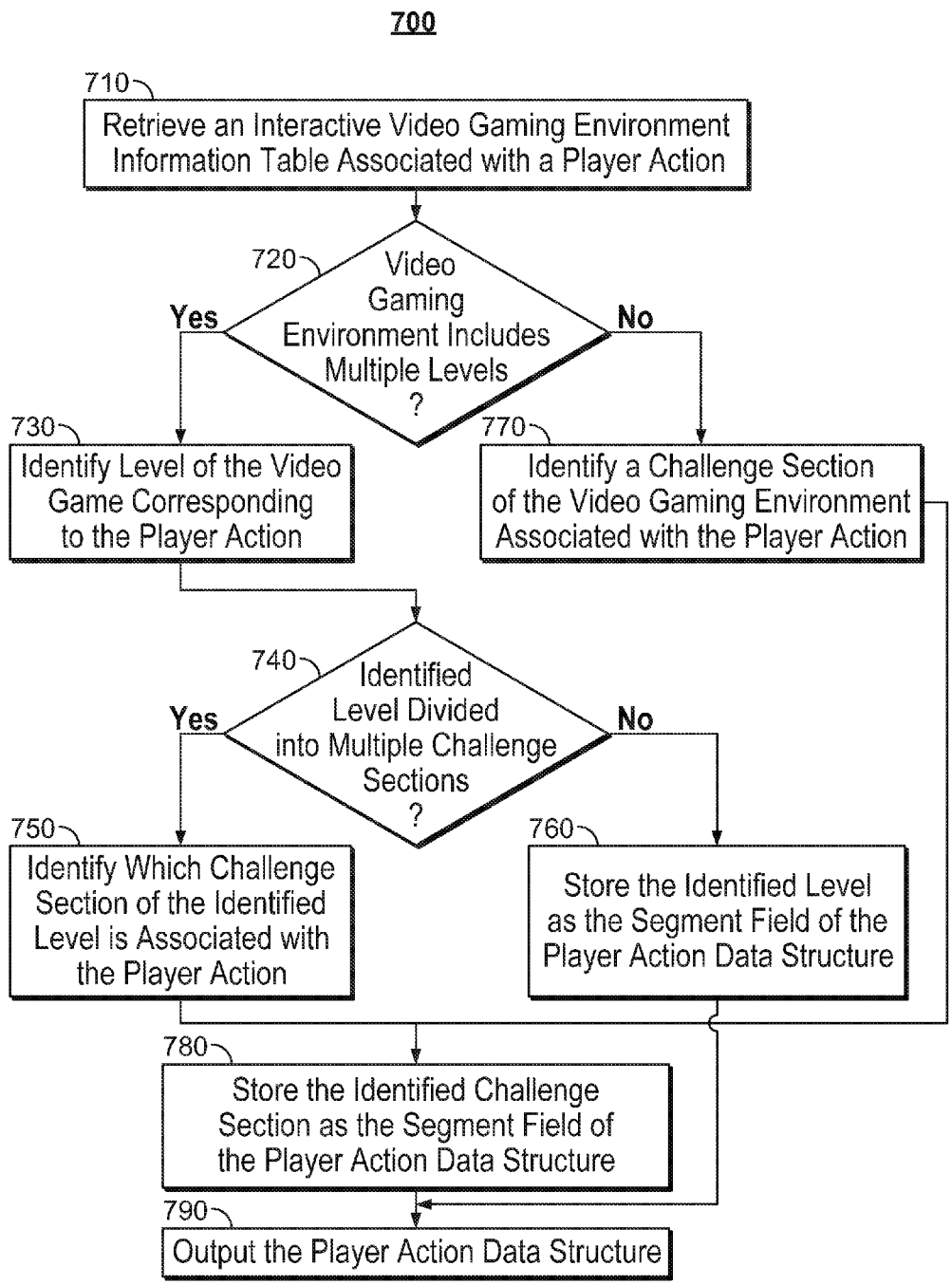

FIG. 7 is an illustrative flow diagram 700 of an interactive video gaming environment in accordance with an embodiment of the present invention. At step 710, an interactive video gaming environment information table associated with a player action is retrieved. For example, user/player equipment 108 and/or player action server 116 may retrieve an information table of the interactive video gaming environment from the video game application in stored memory. In particular, user/player equipment 108 and/or player action server 116 may determine which video game corresponds to a particular player action and retrieve an information table for that video game. In some implementations, this information table may be retrieved directly from a manufacturer or video game distributor of the video game associated with the player action. In some embodiments, the information table may include data that defines each segment of the video game. The information table may include a serial number of the video game, release date information, a description of each level or segment, a number of levels in the video game, a description of each mission or objective of each level or segment and/or any other data that defines the video game.

At step 720, a determination is made as to whether the video gaming environment includes multiple levels. When the video gaming environment includes multiple levels, the process proceeds to step 730, otherwise the process proceeds to step 770.

At step 730, a level of the video game corresponding to the player action is identified.

At step 740, a determination is made as to whether the identified level is divided into multiple challenge sections. When identified level is divided into multiple challenge sections, the process proceeds to step 750, otherwise the process proceeds to step 760.

At step 750, the challenge section of the identified level associated with the player action is identified. For example, user/player equipment 108 and/or player action server 116 may examine the player action to retrieve characteristics of the current player position within the video gaming environment. User/player equipment 108 and/or player action server 116 may compare the retrieved characteristics of the player position with data in the information table to determine the challenge section of the level that is associated with the player action. The characteristics may include coordinates of a character within the map of the level of the video gaming environment, a question or category of a question within the level of the video gaming environment, or any other suitable characteristic that defines a unique circumstance that the player is faced with or that the player is having difficulty with in the level of the interactive video gaming environment.

At step 760, the identified level is stored as the segment field of the player action data structure.

At step 770, a challenge section of the video gaming environment associated with the player action is identified. For example, user/player equipment 108 and/or player action server 116 may examine the player action to retrieve characteristics of the current player position within the video gaming environment. User/player equipment 108 and/or player action server 116 may compare the retrieved characteristics of the player position with data in the information table to determine the challenge section that is associated with the player action. The characteristics may include coordinates of a character within the map of the video gaming environment, a question or category of a question of the video gaming environment, or any other suitable characteristic that defines a unique circumstance that the player is faced with or that the player is having difficulty with in the interactive video gaming environment.

At step 780, the identified challenge section is stored as the segment field of the player action data structure.

At step 790, the player action data structure is output. For example, user/player equipment 108 and/or player action server 116 may store the player action data structure in a memory for subsequent use. User/player equipment 108 may transmit the stored player action data structure to player action server 116 to retrieve a media asset with a hint for the segment identified in the player action data structure. User/player equipment 108 may transmit a segment identifier based on the segment field of the stored player action data structure to player action server 116 to request and retrieve a media asset with a hint for the segment associated with the player action. As referred to above and below, the phrase "player action data structure" is interchangeable with the phrase "game play data structure."

It should be understood that the above steps of the flow diagrams of FIGS. 6 and 7 may be executed or performed in any order or sequence not limited to the order and sequence shown and described in the figures. Also, some of the above steps of the flow diagrams of FIGS. 6 and 7 may be executed or performed substantially simultaneously where appropriate or in parallel to reduce latency and processing times. Some of the above steps of the flow diagrams of FIGS. 6 and 7 are optional and may be skipped.

The above described embodiments of the present disclosure are presented for purposes of illustration and not of limitation, and the present disclosure is limited only by the claims which follow.

What is claimed is:

1. A method for providing hints, the method comprising:
   generating a display of a video game comprising a series of segments, wherein the video game is received from a first source;
   determining that a segment of the series of segments corresponds to a current level of progress of a user in the video game, wherein determining that the segment of the series of segments corresponds to the current level of progress of the user comprises:
      determining, using the processing circuitry, a characteristic associated with a current player position;
      retrieving, from a second source, an information table comprising a plurality of characteristics associated with the series of segments in the video game; and
      comparing the characteristic with the plurality of characteristics to determine that the segment of the series of segments corresponds to the current level of progress;
   comparing, using processing circuitry, the current level of progress to a threshold level of progress;
   in response to the comparing, determining that the current level of progress is lower than the threshold level of progress;
   in response to the determining that the current level of progress is lower than the threshold level of progress, automatically retrieving from the second source a hint video that provides a hint for the segment; and
   in response to the automatically retrieving the hint video, automatically generating a display of the retrieved hint video to the user.

2. The method of claim 1, wherein the threshold level of progress is an expected period of time for the user to complete the segment or an expected number of attempts for a user to complete the segment.

3. The method of claim 1, wherein the second source is a remote server, and wherein the retrieving from the second source the hint video comprises searching the remote server for a third-party generated hint video that provides the hint for the segment.

4. The method of claim 3, wherein the third-party is a user of the video game.

5. The method of claim 3, wherein the remote server is configured to:
   generate a request for hint videos, wherein each of the hint videos provides a hint for one of the series of segments of the video game;
   in response to the request, receive a plurality of hint videos from the third-party;
   select, from the received plurality of hint videos, the hint video that provides the hint for the segment; and
   deliver the selected hint video to the user of the video game.

6. The method of claim 1, wherein the characteristic associated with the current position of the user in the video game comprises at least one of coordinates of a character in the video game or a question within the video game.

7. The method of claim of 1, wherein the retrieving the hint video from the second source comprises retrieving a data structure indicating that the hint video comprises a hint for the segment.

8. The method of claim 1, further comprising:
   automatically generating a request for the hint video, without receiving input from the user for the hint, based on the current level of progress in the video game.

9. The method of claim 1, further comprising:
   determining whether the retrieved hint video was previously accessed by the user;
   in response to the determining that the retrieved hint video was previously accessed by the user, retrieving another hint video that provides a hint for the segment that corresponds to the current level of progress in the video game.

10. The method of claim 1, wherein the current level of progress is determined based on a response from the user to an inquiry generated during game play of the video game, an indication that the user completed the segment, or an indication that the user reached or failed to reach the segment.

11. A system for providing hints, the system comprising a processing circuitry configured to:
    generate a display of a video game comprising a series of segments, wherein the video game is received from a first source;
    determine that a segment of the series of segments corresponds to a current level of progress of a user in the video game, wherein the processing circuitry determines that the segment of the series of segments corresponds to the current level of progress of the user by:
        determining, using the processing circuitry, a characteristic associated with a current position of the user of the video game;
        retrieving, from a second source, an information table comprising a plurality of characteristics associated with the series of segments in the video game; and
        comparing the characteristic with the plurality of characteristics to determine that the segment of the series of segments corresponds to the current level of progress;
    compare the current level of progress to a threshold level of progress;
    in response to the comparing, determine that the current level of progress is lower than the threshold level of progress;
    in response to the determining that the current level of progress is lower than the threshold level of progress, automatically retrieve from the second source a hint video that provides a hint for the segment; and
    in response to the automatically retrieving the hint video, automatically generate a display of the retrieved hint video to the user.

12. The system of claim 11, wherein the threshold level of progress is an expected period of time for the user to complete the segment or an expected number of attempts for a user to complete the segment.

13. The system of claim 11, wherein the second source is a remote server, and wherein the processing circuitry that is configured to retrieve from the second source the hint video comprises processing circuitry configured to search the remote server for a third-party generated hint video that provides the hint for the segment.

14. The system of claim 13, wherein the third-party is a user of the video game.

15. The system of claim 13, wherein the remote server is configured to:
    generate a request for hint videos, wherein each of the hint videos provides a hint for one of the series of segments of the video game;
    in response to the request, receive a plurality of hint videos from the third-party;
    select, from the received plurality of hint videos, the hint video that provides the hint for the segment; and
    deliver the selected hint video to the user of the video game.

16. The system of claim 11, wherein the characteristic associated with the current position of the user in the video game comprises at least one of coordinates of a character in the video game or a question within the video game.

17. The system of claim of 11, wherein the processing circuitry that is configured to retrieve the hint video from the second source comprises processing circuitry configured to retrieve a data structure indicating that the hint video comprises a hint for the segment.

18. The system of claim 11, wherein the processing circuitry is further configured to:
    automatically generate a request for the hint video, without receiving input from the user for the hint, based on the current level of progress in the video game.

19. The system of claim 11, wherein the control circuitry is further configured to:
    determine whether the retrieved hint video was previously accessed by the user;
    in response to the determining that the retrieved hint video was previously accessed by the user, retrieve another hint video that provides a hint for the segment that corresponds to the current level of progress in the video game.

20. The system of claim 11, wherein the current level of progress is determined based on a response from the user to an inquiry generated during game play of the video game, an indication that the user completed the segment, or an indication that the user reached or failed to reach the segment.

* * * * *